United States Patent
Quick et al.

(10) Patent No.: US 10,715,014 B2
(45) Date of Patent: Jul. 14, 2020

(54) ELECTRIC MOTOR

(71) Applicant: Electric Vehicle Systems and Technology Pty Ltd, Warrnambool, Victoria (AU)

(72) Inventors: Duncan Richard Quick, Snake Valley (AU); Duncan John Hedditch, Grantville (AU)

(73) Assignee: Electric Vehicle Systems and Technology Pty Ltd, Warrnambool (AU)

(*) Notice: Subject to any disclaimer, the term of this patent is extended or adjusted under 35 U.S.C. 154(b) by 67 days.

(21) Appl. No.: 15/550,406

(22) PCT Filed: Feb. 3, 2016

(86) PCT No.: PCT/AU2016/050060
§ 371 (c)(1),
(2) Date: Aug. 11, 2017

(87) PCT Pub. No.: WO2016/127207
PCT Pub. Date: Aug. 18, 2016

(65) Prior Publication Data
US 2018/0019646 A1    Jan. 18, 2018

(30) Foreign Application Priority Data

Feb. 13, 2015 (AU) .................. 2015900464

(51) Int. Cl.
*H02K 3/26* (2006.01)
*H02K 16/04* (2006.01)
(Continued)

(52) U.S. Cl.
CPC .............. *H02K 11/33* (2016.01); *H02K 3/26* (2013.01); *H02K 21/24* (2013.01); *H02K 16/04* (2013.01);
(Continued)

(58) Field of Classification Search
CPC .......... H02K 11/33; H02K 21/24; H02K 3/26; H02K 3/04; H02K 2213/06; H02K 16/04; H02K 2203/03
(Continued)

(56) References Cited

U.S. PATENT DOCUMENTS 3,566,727 A * 3/1971 Weiss ................ H02K 3/26
                                                    83/50
4,500,806 A * 2/1985 Kanayama ........... H02K 3/26
                                                    310/198

(Continued)

OTHER PUBLICATIONS

International Search Report and Written Opinion dated Apr. 13, 2016 in connection with International Application No. PCT/AU2016/050060.

(Continued)

*Primary Examiner* — John K Kim
(74) *Attorney, Agent, or Firm* — Wolf, Greenfield & Sacks, P.C.

(57) ABSTRACT

A low voltage high current permanent magnet DC electromagnetic heteropolar motor, including (a) at least one permanent magnet rotor; (b) a shaft in mechanical communication with the rotor such that axial rotation of the rotor causes axial rotation of the shaft; (c) at least one stator winding; (d) a plurality of switches, each functioning to provide commutation switching for the stator so as to generate a torque on the rotor and thereby cause said axial rotation of the shaft, wherein a terminal voltage of said machine is equal to the voltage of one electrochemical cell, and wherein the power of said machine is at least 1 kW.

15 Claims, 19 Drawing Sheets

(51) Int. Cl.
*H02K 21/24* (2006.01)
*H02K 11/33* (2016.01)
(52) U.S. Cl.
CPC ..... *H02K 2203/03* (2013.01); *H02K 2213/06* (2013.01)
(58) Field of Classification Search
USPC .................................................. 310/10, 201
See application file for complete search history.

(56) References Cited

U.S. PATENT DOCUMENTS

| | | | |
|---|---|---|---|
| 4,585,085 A | 4/1986 | Handel et al. | |
| 5,280,228 A * | 1/1994 | Kanouda | H02M 7/53875 |
| | | | 318/801 |
| 7,109,625 B1 * | 9/2006 | Jore | H02K 21/24 |
| | | | 310/198 |
| 7,291,956 B2 * | 11/2007 | Itoh | H02K 3/26 |
| | | | 310/208 |
| 8,006,789 B2 | 8/2011 | Dial | |
| 10,170,953 B2 * | 1/2019 | Shaw | H02K 21/24 |
| 2005/0285470 A1 * | 12/2005 | Itoh | H02K 3/26 |
| | | | 310/208 |
| 2006/0055265 A1 * | 3/2006 | Zalusky | H02K 3/26 |
| | | | 310/156.32 |
| 2006/0202584 A1 * | 9/2006 | Jore | H02K 21/24 |
| | | | 310/179 |
| 2006/0279150 A1 * | 12/2006 | Kojima | H02K 3/524 |
| | | | 310/91 |
| 2008/0272664 A1 | 11/2008 | Flynn | |
| 2010/0164316 A1 * | 7/2010 | Langford | H02K 1/2793 |
| | | | 310/156.29 |
| 2010/0277025 A1 * | 11/2010 | Doi | H02K 1/2793 |
| | | | 310/156.12 |
| 2013/0307367 A1 * | 11/2013 | Yoshida | H02K 3/26 |
| | | | 310/198 |
| 2018/0019646 A1 * | 1/2018 | Quick | H02K 21/24 |

OTHER PUBLICATIONS

International Preliminary Report on Patentability dated Aug. 24, 2017 in connection with International Application No. PCT/AU2016/050060.

* cited by examiner

ELECTRIC MOTOR

TECHNICAL FIELD

The present invention relates to a low voltage high current permanent magnet DC electromagnetic heteropolar motor.

BACKGROUND

As global oil reserves decline, the motivation to develop battery electric vehicles increases. As a consequence, improvements to the range and weight of electric vehicles become economically desirable.

To increase the efficiency of power conversion, the system voltage in battery powered electric vehicles (BEVs) has increased over the past decade from around 150V, to over 600V. Future systems of over 800V are expected. The safety risks of electrocution and fire inherent in the presence of such high voltages can be managed by methods such as chassis short circuit detection and automatic isolation, manually operated high voltage isolators, and insulating gloves worn by emergency services personnel, but risk management principles would suggest elimination of the problem is a safer solution than either personal protective equipment (PPE) or engineering solutions. Eliminating the problems caused by high voltage (HV) batteries can be achieved by lowering the system voltage. However, as above-mentioned, designers of BEVs are typically increasing system voltage, not decreasing it. Increasing the system voltage reduces conductor size and cost, and increases the efficiency, since the volt drop across IGBTs is lower at lower currents, reducing losses.

BEVs use one or more batteries with cells in series. Series cells require balancing circuits to ensure each cell has the same voltage. Typically, one cell balancer circuit is required across each cell. This means the use of very small cells leads to an expensive set of balancers. The function of the balancer circuit is well known to those skilled in the art and need not be detailed herein. Balancers are essential to reliably achieve the desired charge-discharge range and a long service life for the battery.

Even with cell charge balancers, the discharge depth of the cells does still vary with cell age, temperature and other factors, so eventually with all series strung batteries, a cell will fail, being forced into reverse polarity by the other cells, causing failure of the battery pack.

Cell bypassing can be provided to ensure cells do not over or under charge. However, only in very small cell batteries, can cell bypassing circuitry be built economically.

For BEVs, cell bypassing is uneconomic, and the whole battery has to be replaced after around eight years.

All series strung batteries require cell monitoring to detect cell under voltage and trip out the battery. Under voltage on any single cell therefore leads to battery failure and therefore in a BEV, vehicle failure. The reliability of the vehicle can only be improved by the use of two or more batteries.

It is desired to provide an electric motor that alleviates one or more difficulties of the prior art, or that at least provides a useful alternative.

SUMMARY

According to the present invention, there is provided a low voltage high current permanent magnet DC electromagnetic heteropolar motor, including:

(a) at least one permanent magnet rotor;
(b) a shaft in mechanical communication with the rotor such that axial rotation of the rotor causes axial rotation of the shaft;
(c) at least one stator winding;
(d) a plurality of switches, each functioning to provide commutation switching for the stator so as to generate a torque on the rotor and thereby cause said axial rotation of the shaft, wherein a terminal voltage of said machine is equal to the voltage of one electrochemical cell, and wherein the power of said machine is at least 1 kW.

Preferably, the switches include multiple transistor half bridge switches, each one of said half bridge switches connecting to separate points of the stator winding, where said half bridge transistor switches function to provide commutation switching and to regulate current in said stator winding so as to generate a torque on the rotor and thereby cause said axial rotation of the shaft. Preferably, the transistor half bridge switches are located proximal to respective separate points of the stator winding.

The transistor half bridge switches are preferably located within 5 mm of respective separate points of the stator winding. Each of one said at least one stator windings preferably comprises one half of one turn only, such that, in use, two of said half bridges are activated, one high side transistor on in one half bridge and one low side transistor on in one other half bridge, in order to complete a circuit to form a one turn winding.

According to the present invention, there is also provided an electric vehicle including:

(a) a chassis;
(b) propulsion means coupled to the chassis;
(c) the electric motor claimed in any one of claims 1 to 22 coupled to the chassis and in mechanical communication with the propulsion means; and
(d) power supply including a plurality of batteries connected in parallel with respective sections of the electric motor.

According to the present invention, there is also provided a brushless permanent magnet DC motor for electric vehicle traction, comprising:

(a) at least one permanent magnet rotor;
(b) at least one stator winding; and
(c) at least one battery, wherein the voltage of said battery is equal to the voltage of one electrochemical cell.

According to the present invention, there is also provided an electromagnetic power conversion brushless machine including a parallel connected battery.

According to the present invention, there is also provided a battery system for an electric motor including:

(a) a rotor;
(b) a shaft extending axially through the rotor, the shaft being in mechanical communication with the rotor such that axial rotation of the rotor causes axial rotation of the shaft; and
(c) a stator, the battery system including:

(i) a direct current (DC) power source including a plurality of batteries electrically connected in parallel to respective sectors of said stator; and
(ii) a plurality of driver switches configured to generate alternating current (AC) signals so as to generate a torque on the rotor and thereby cause axial rotation of the shaft.

According to the present invention, there is also provided a brushless DC motor, including:
(a) a rotor including:
  (i) a rotor disc; and
  (ii) a ring of spaced apart permanent magnets coupled around an outer circumferential section of said rotor disc;
(b) a shaft extending axially through the rotor disc, the shaft being in mechanical communication with the rotor disc such that axial rotation of the rotor disc causes axial rotation of the shaft;
(c) a stator, including a stator disc having circumferentially distributed and radially directed slots therein that define corresponding radially directed elongate electrically conductive bars; and
(d) driver switches electrically coupled to and co-located with radially outer ends of the elongate bars of the stator and configured to generate currents that flow along the elongate bars of the stator in alternating radial directions so as to generate a torque on the rotor and thereby cause axial rotation of the shaft.

According to the present invention, there is also provided a low voltage high current permanent magnet DC electromagnetic heteropolar motor, including:
(a) at least one permanent magnet rotor;
(b) a shaft in mechanical communication with the rotor such that axial rotation of the rotor causes axial rotation of the shaft;
(c) at least one stator winding;
(d) a plurality of switches, each functioning to provide commutation switching for the stator so as to generate a torque on the rotor and thereby cause said axial rotation of the shaft,
wherein a terminal voltage of said machine is equal to the voltage of one electrochemical cell.

According to the present invention, there is also provided a low voltage high current permanent magnet DC electromagnetic heteropolar generator, including:
(a) at least one permanent magnet rotor;
(b) a shaft in mechanical communication with the rotor such that axial rotation of the rotor causes axial rotation of the shaft;
(c) at least one stator winding;
(d) a plurality of switches, each functioning to provide commutation for the stator from flux generated by axial rotation of the rotor caused said axial rotation of the shaft,
wherein a terminal voltage of said machine is equal to the voltage of one electrochemical cell, and
wherein the power of said machine is at least 1 kW.

BRIEF DESCRIPTION OF THE DRAWINGS

Some embodiments of the present invention are hereinafter described, by way of example only, with reference to the accompanying drawings, wherein:
FIG. 2a is a side view of the motor shown in FIG. 1a.

DETAILED DESCRIPTION

Figure 1:
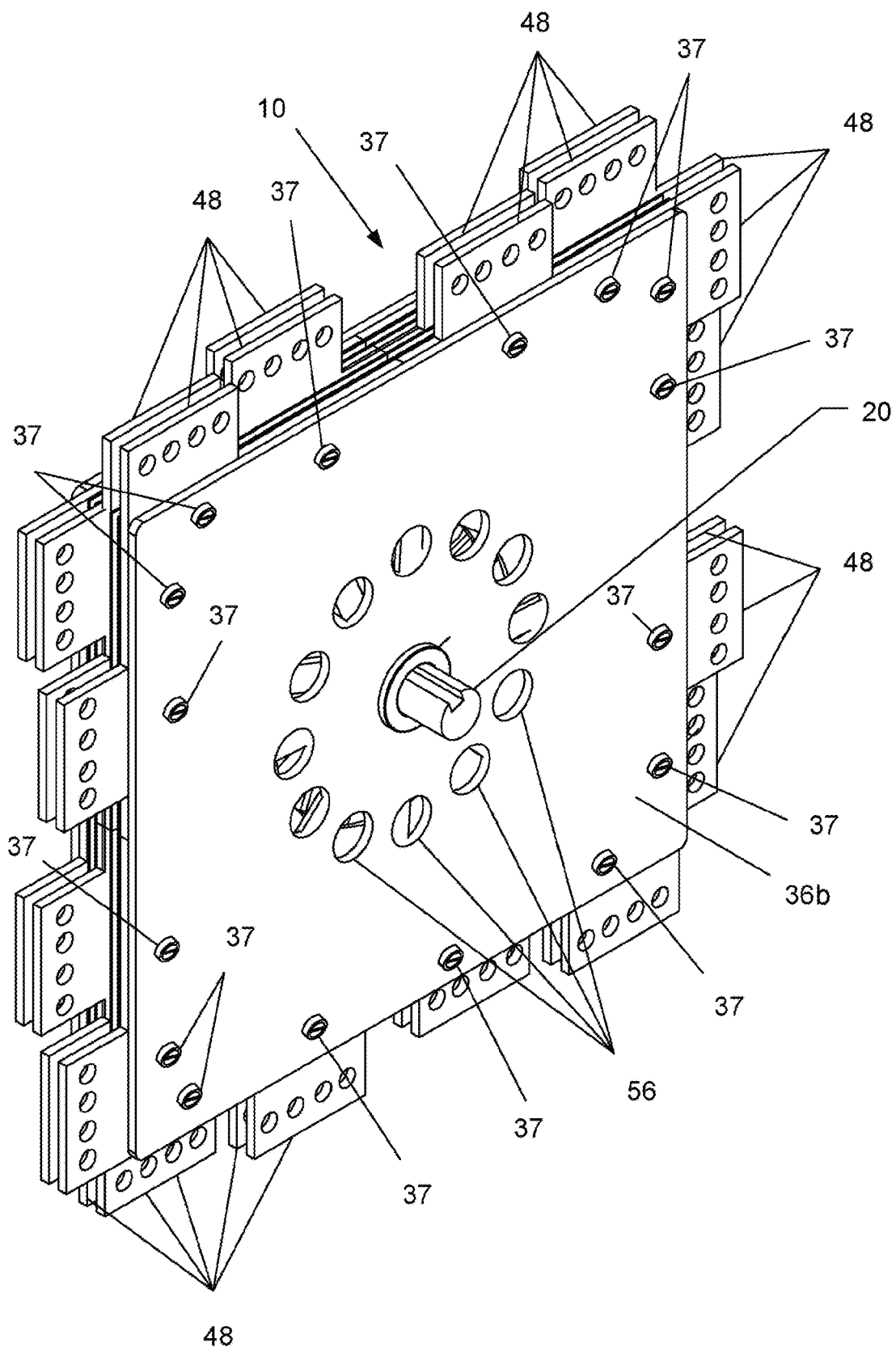
FIG. 1 is side perspective view of an electric motor.
Figure 2A:
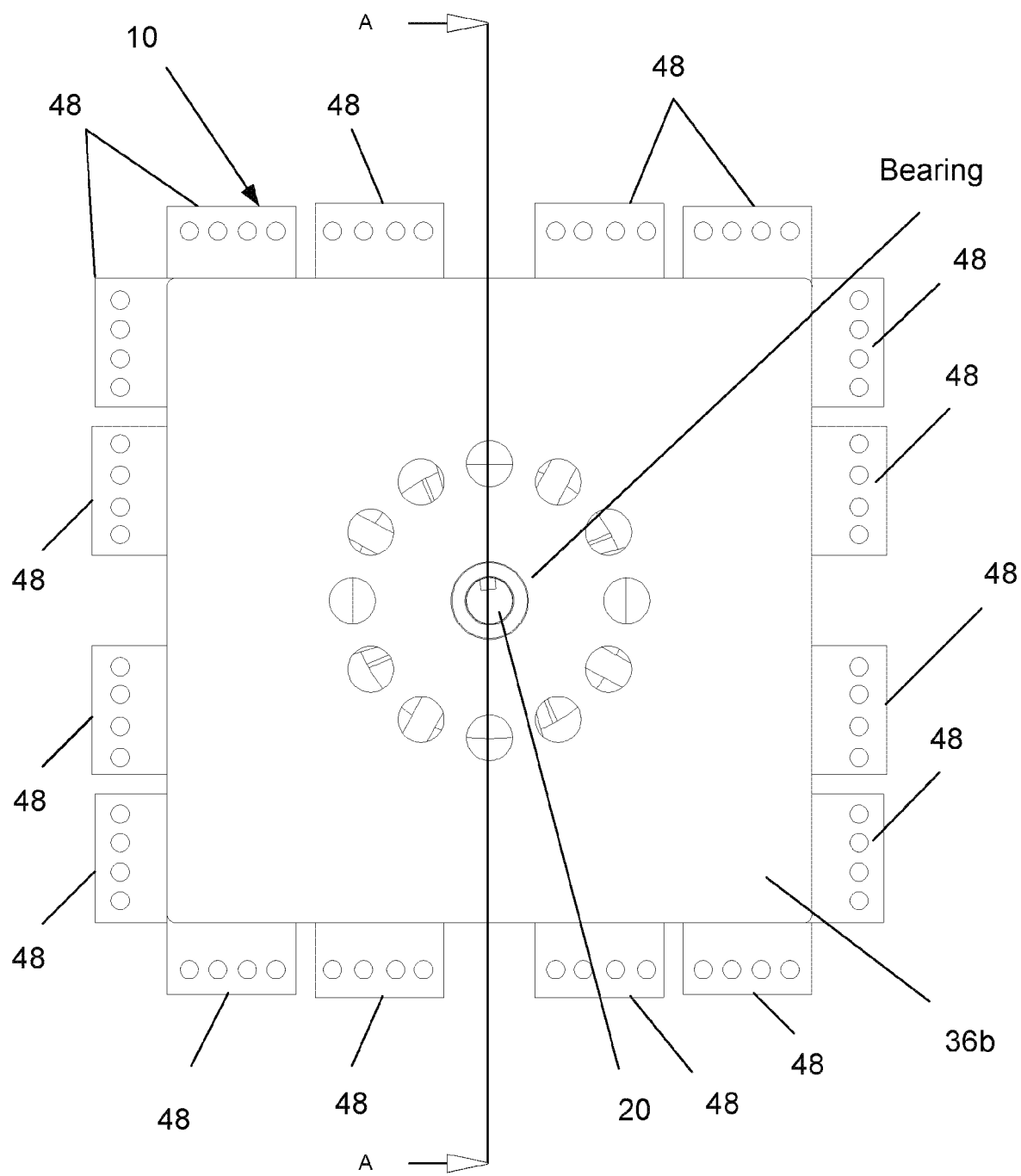
Figure 2B:
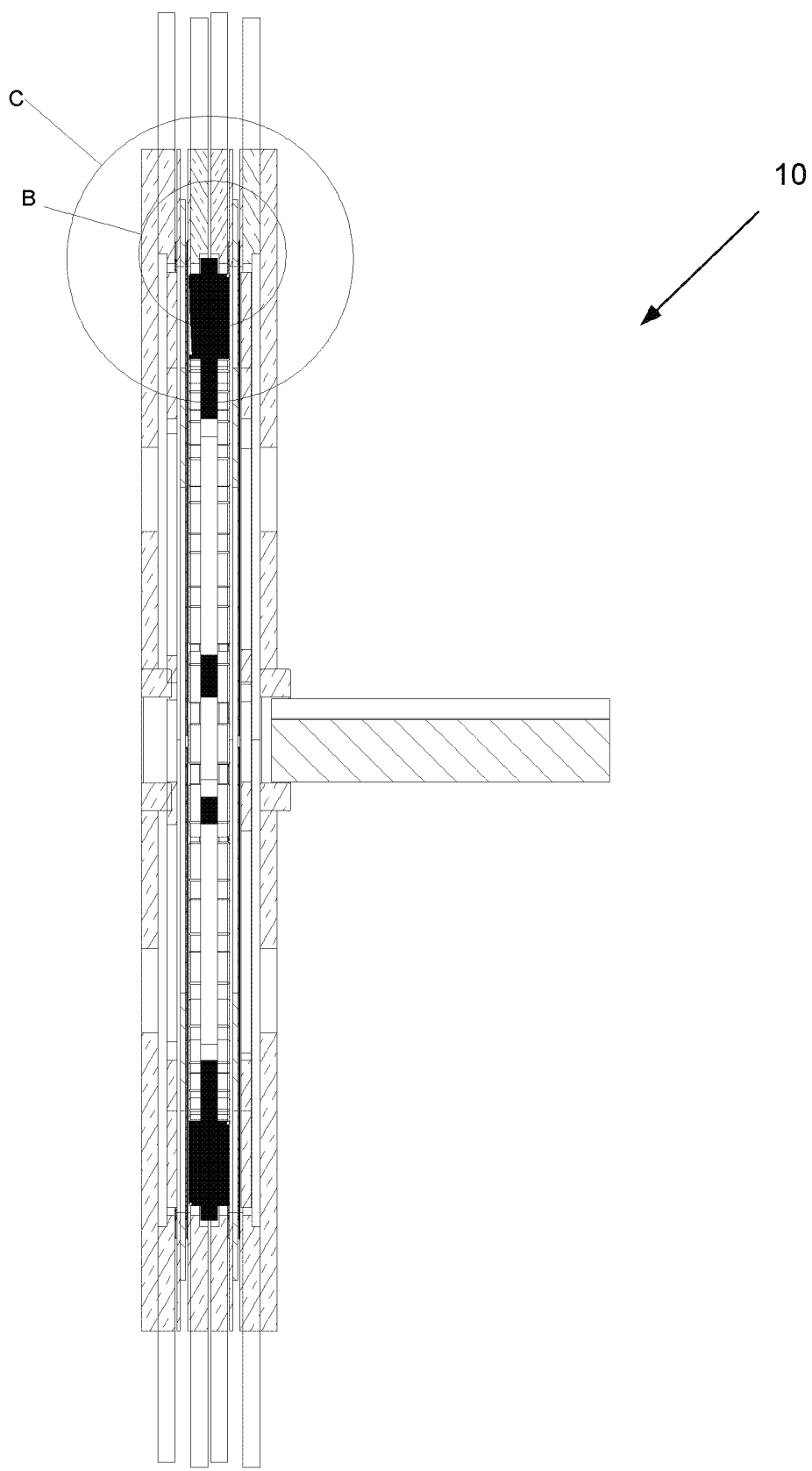
FIG. 2b is a section view of the motor shown in FIG. 2a through the line A-A.
Figure 2C:
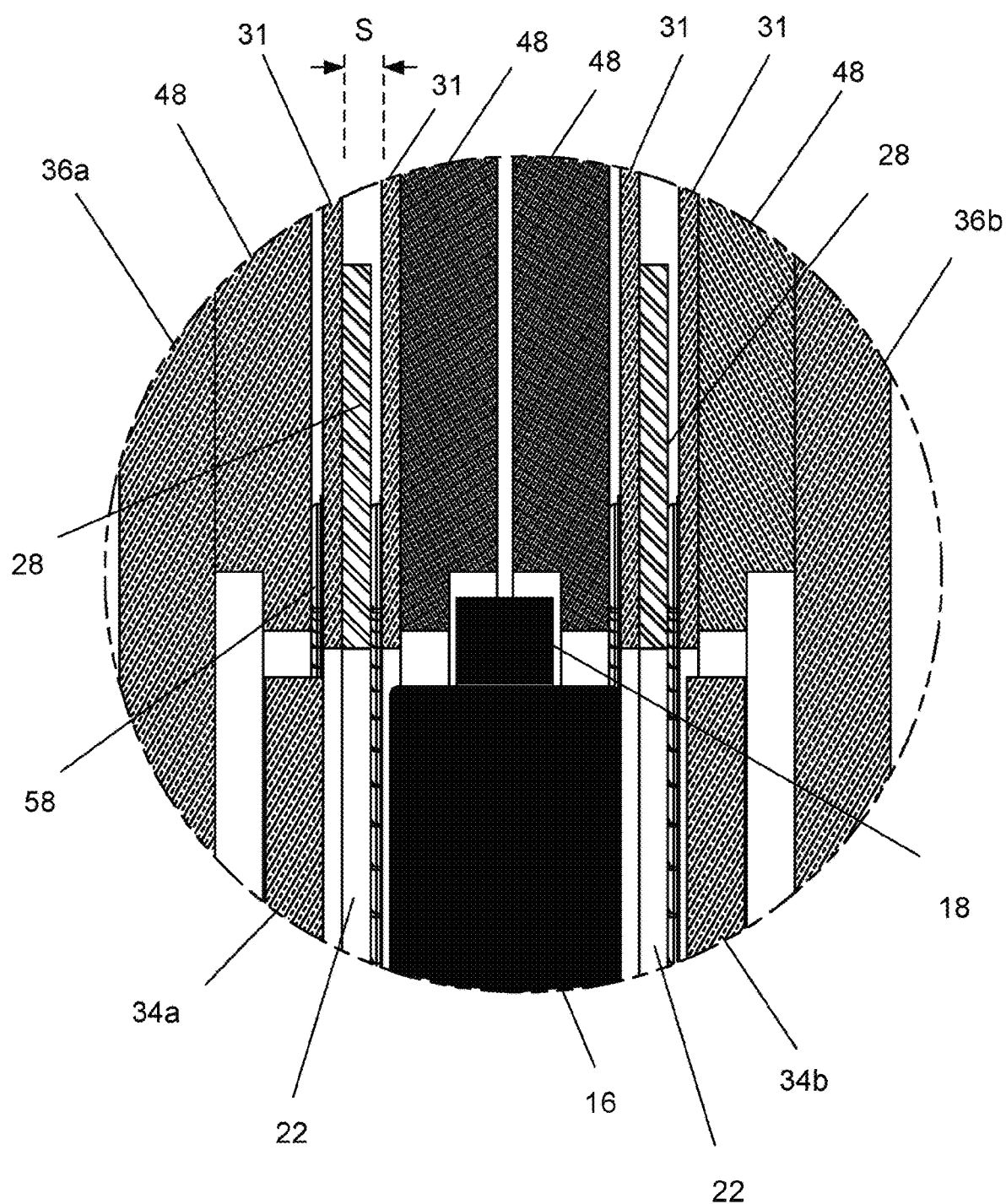
FIG. 2c is an enlarged view of section "B" of the motor shown in FIG. 2b.
Figure 2D:
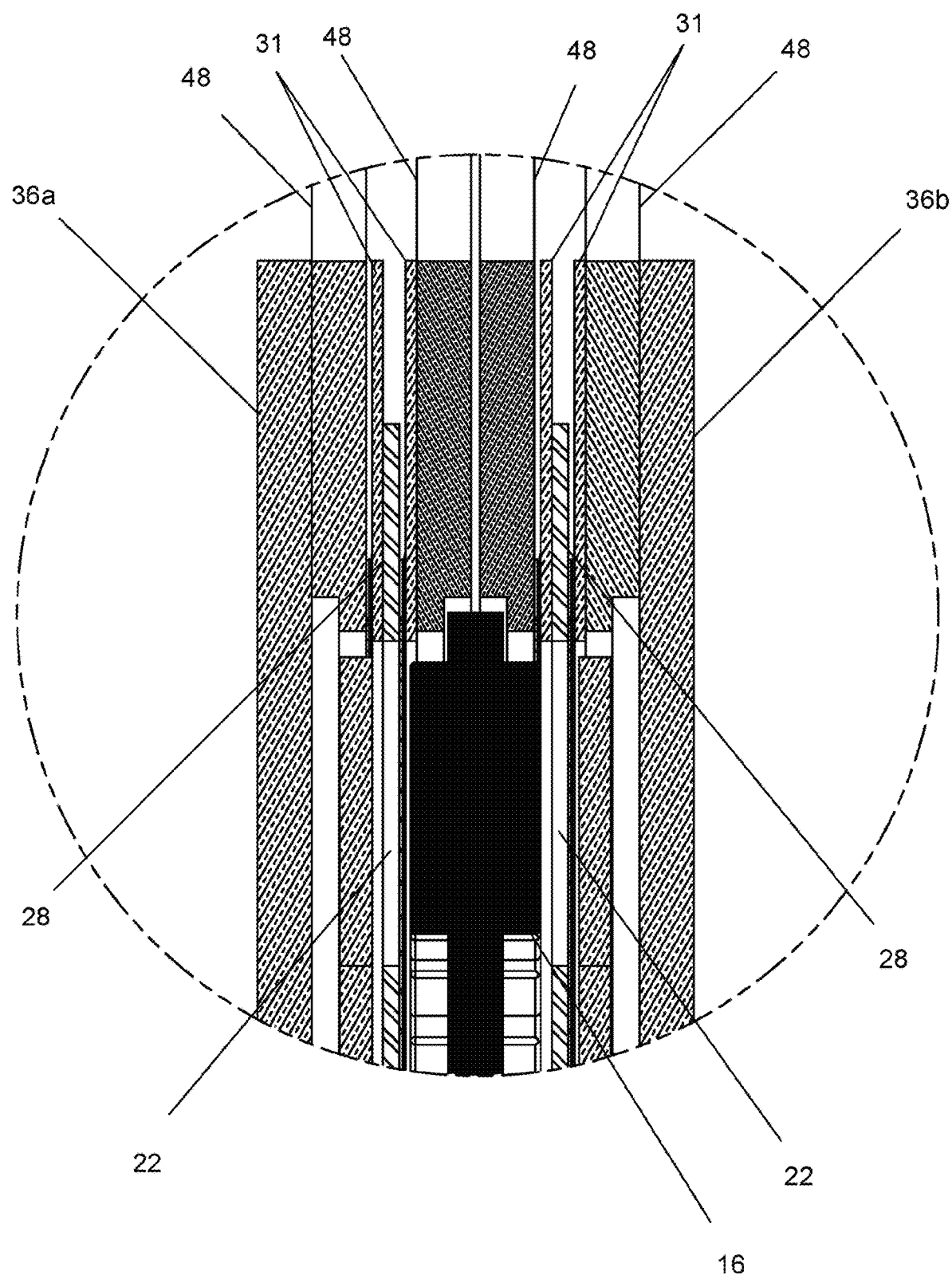
FIG. 2d is an enlarged view of the section "C" of the motor shown in FIG. 2b.
Figure 3:
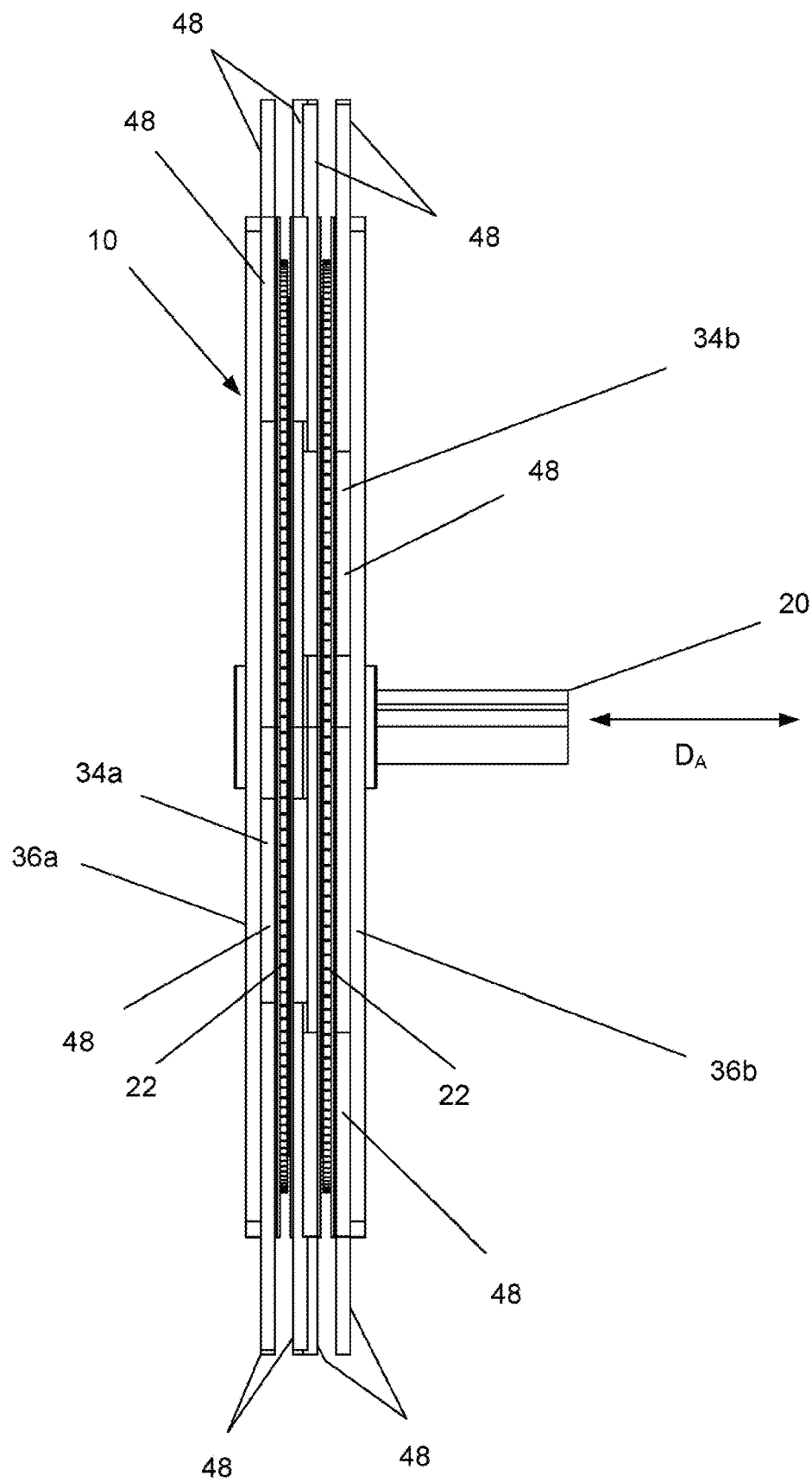
FIG. 3 is an end view of the motor shown in FIG. 1.
Figure 4:
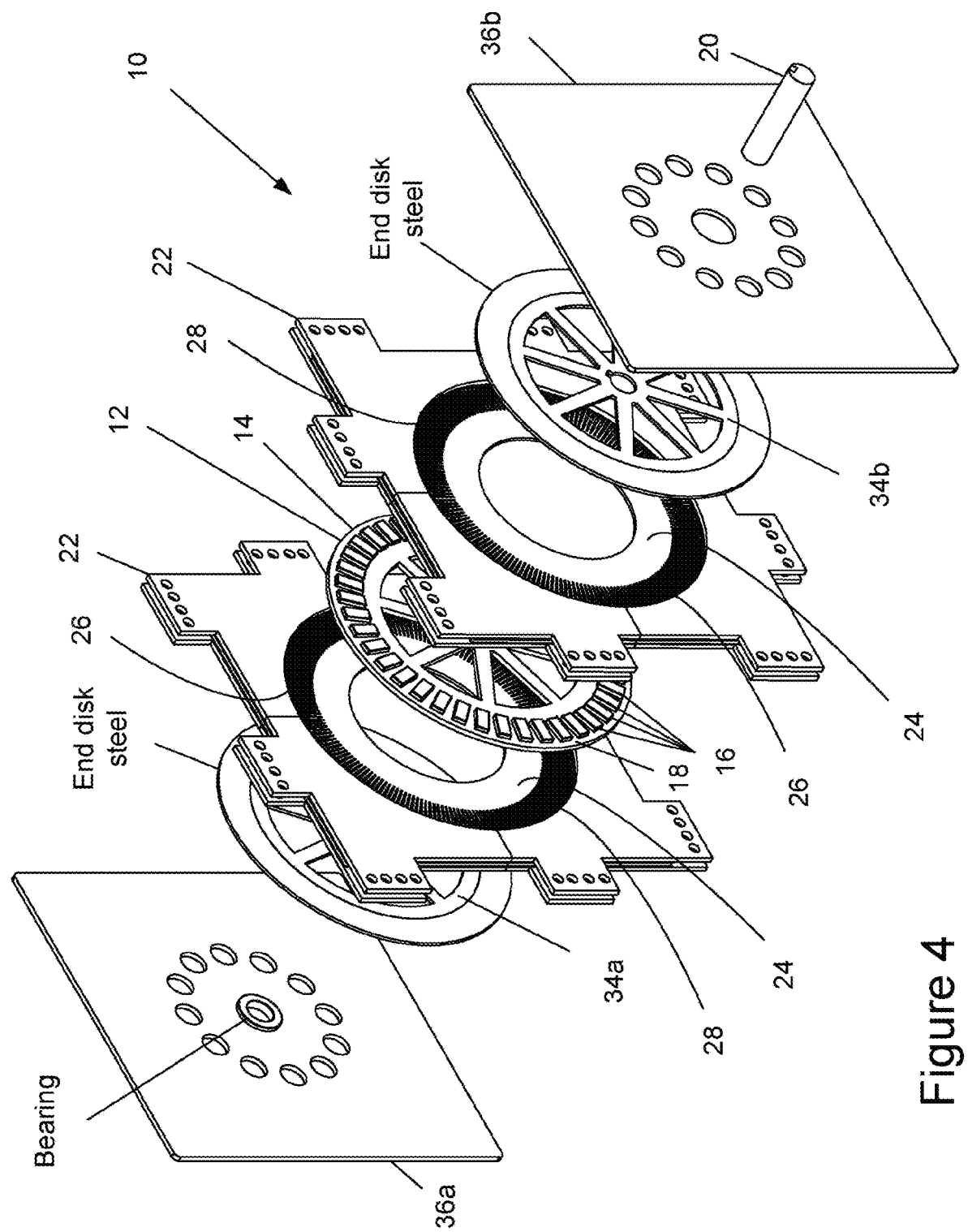
FIG. 4 is a partly exploded view of the motor shown in FIG. 1.
Figure 5A:
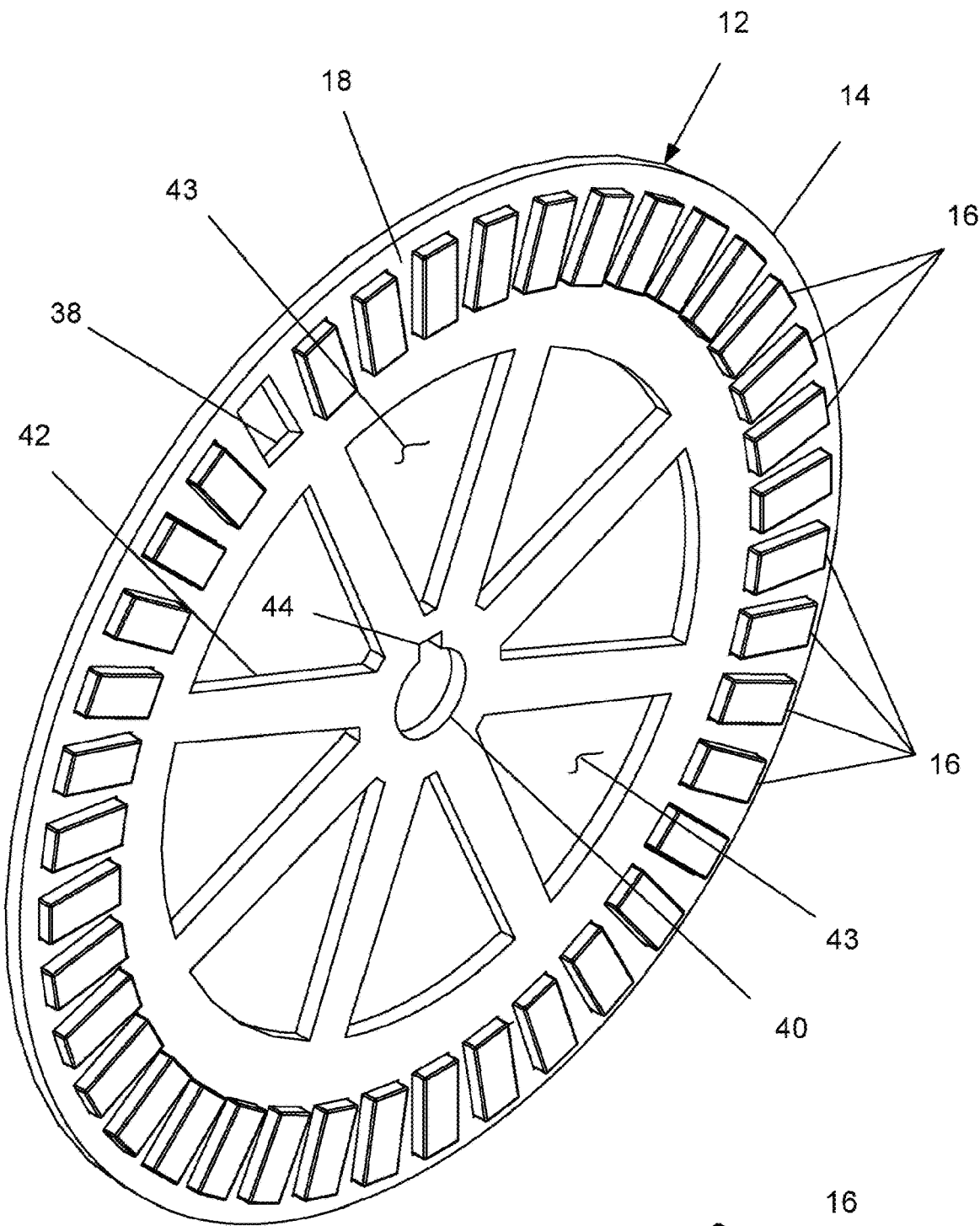
FIG. 5a is a side perspective view of a rotor of the motor shown in FIG. 1.
Figure 5B:
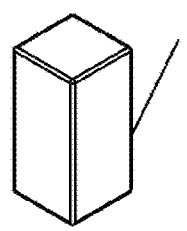
FIG. 5b is a side perspective view of a magnet of the rotor shown in FIG. 9.
Figure 6:
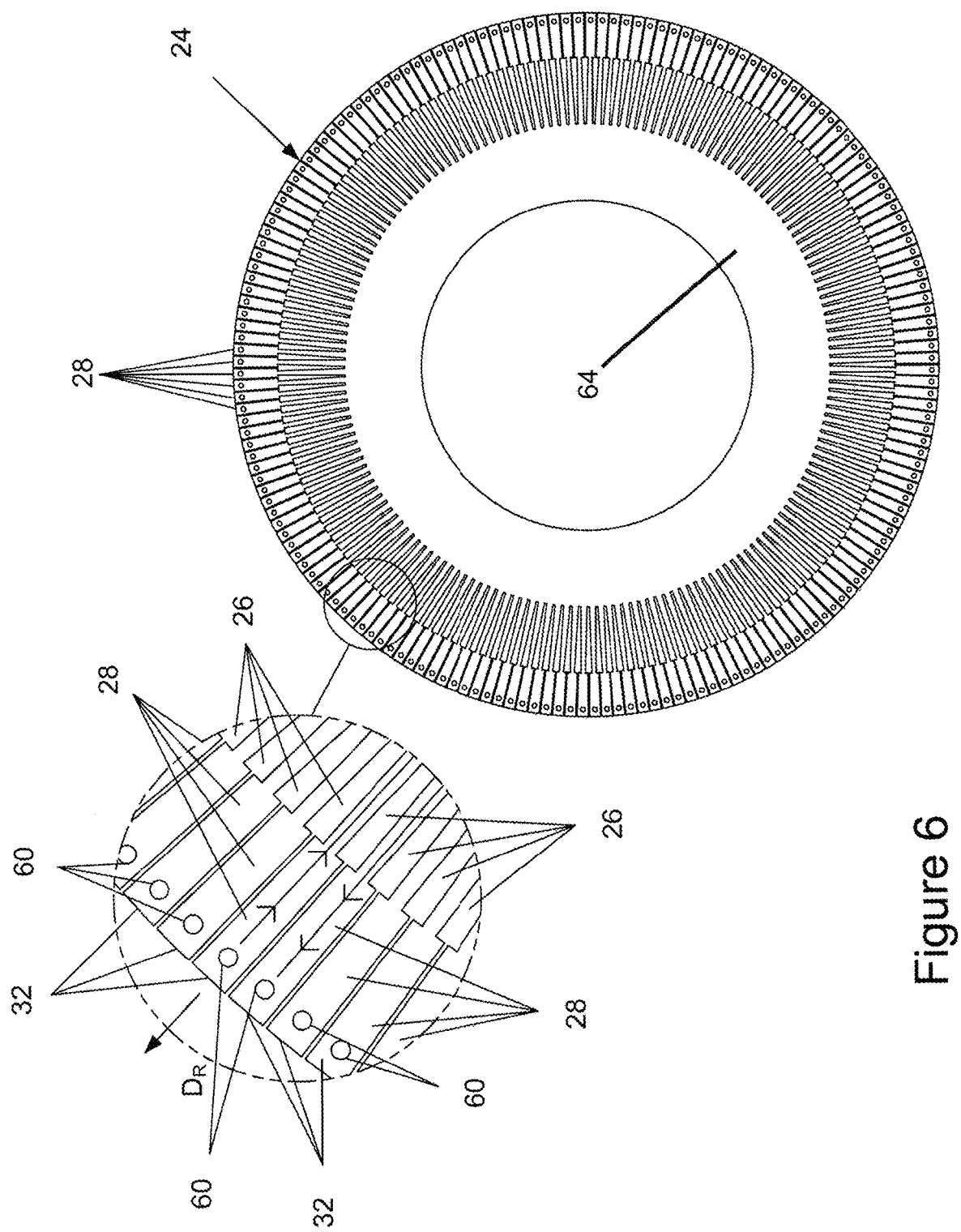
FIG. 6 is a side perspective view of a stator disc of the motor shown in FIG. 1.
Figure 7A:
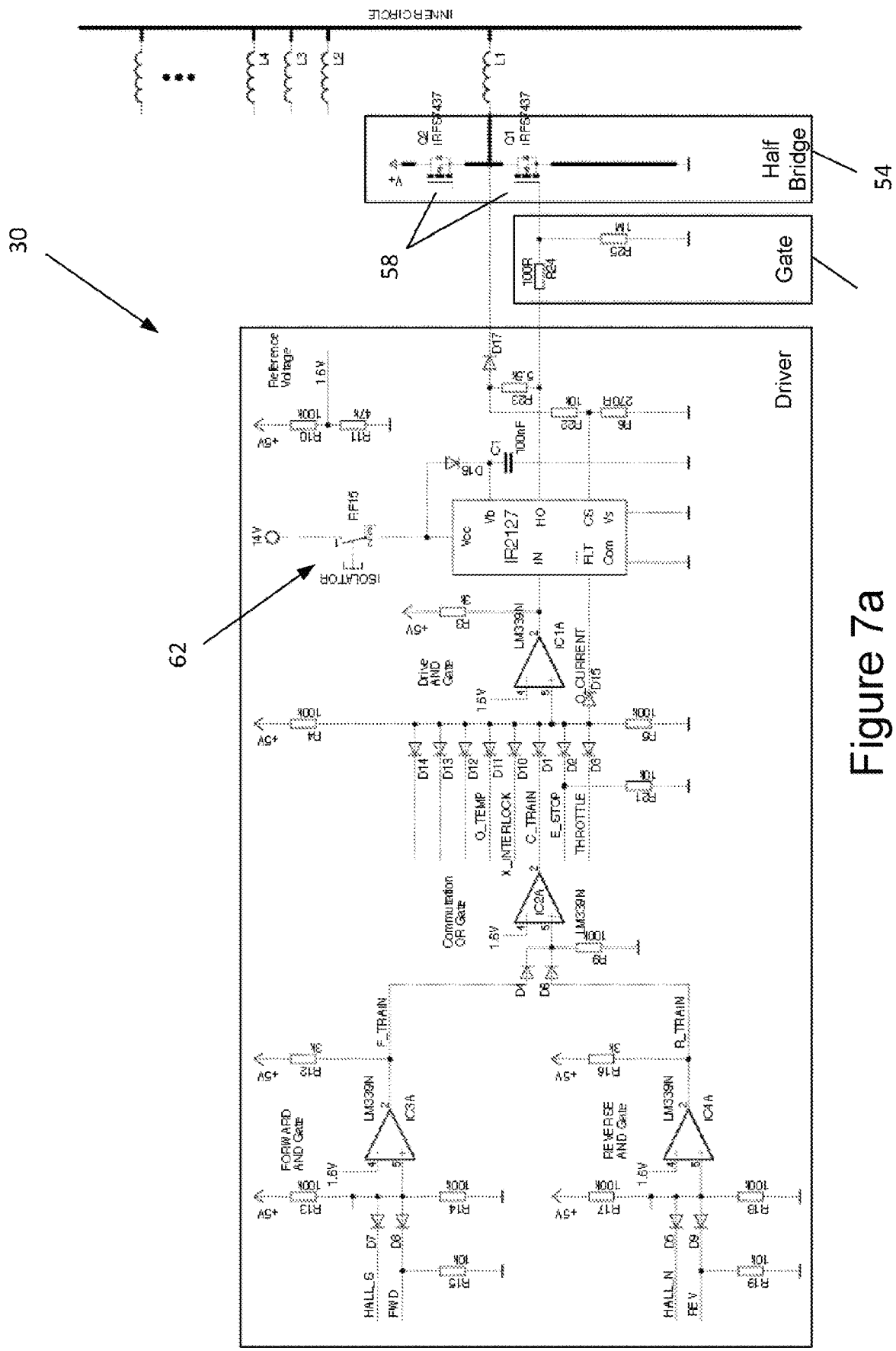
FIGS. 7a to 7c are schematic diagram showing a circuit for a driver for one bar of the motor shown in FIG. 1.
Figure 7B:
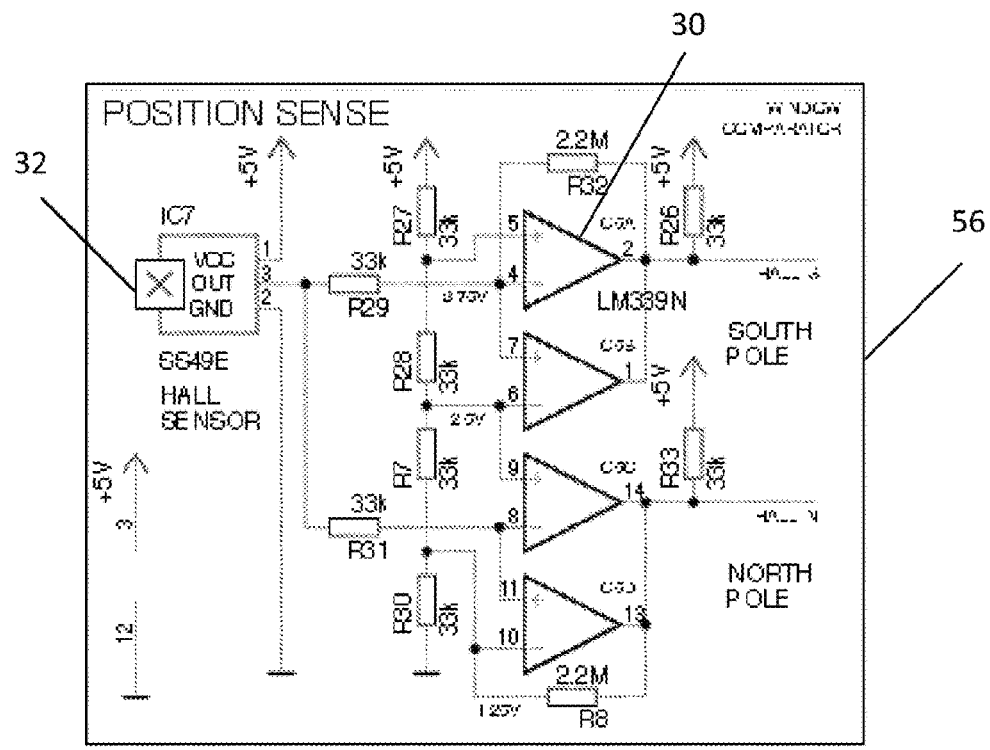
Figure 7C:
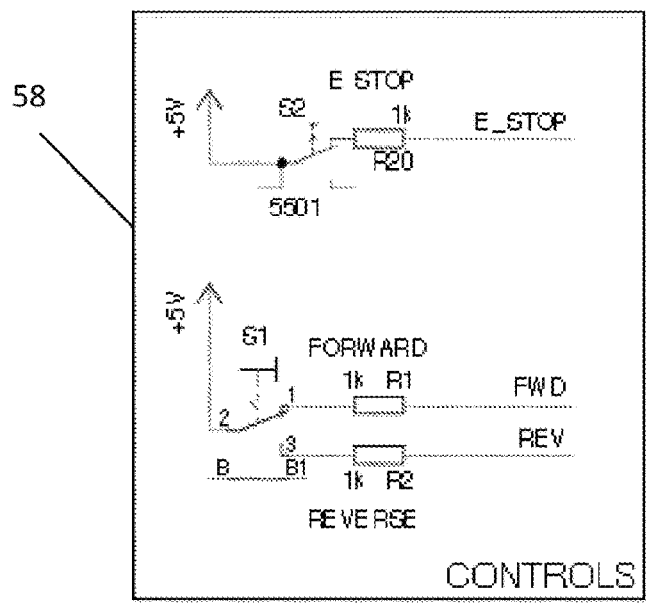

The brushless direct current (DC) motor 10 shown in FIGS. 1 to 4, includes a rotor 12 including a rotor disc 14 and a ring of spaced apart permanent magnets 16 coupled around an outer circumferential section 18 of the rotor disc 14 in the manner shown in FIGS. 5a and 5b. The motor 10 also includes a shaft 20 extending axially in direction "$D_A$" through the rotor disc 14. The shaft 20 is in mechanical communication with the rotor disc 14 such that axial rotation of the rotor disc 14 causes axial rotation of the shaft 20. As shown in FIG. 6, the motor 10 also includes a stator 22 that includes a stator disc 24 having circumferentially distributed and radially directed slots 26 therein that define corresponding radially directed "$D_R$" elongate electrically conductive bars 28. The motor 10 further includes driver switches 30, as shown in FIGS. 7a to 7c, electrically coupled to and co-located with radially outer ends 32 of the elongate bars 28 of the stator 22 and configured to generate alternating current (AC) signals that flow along the elongate bars 28 of the stator 22 in alternating radial directions "$D_R$" so as to generate a torque on the rotor and thereby cause the axial rotation of the shaft 20.

Figure 8:
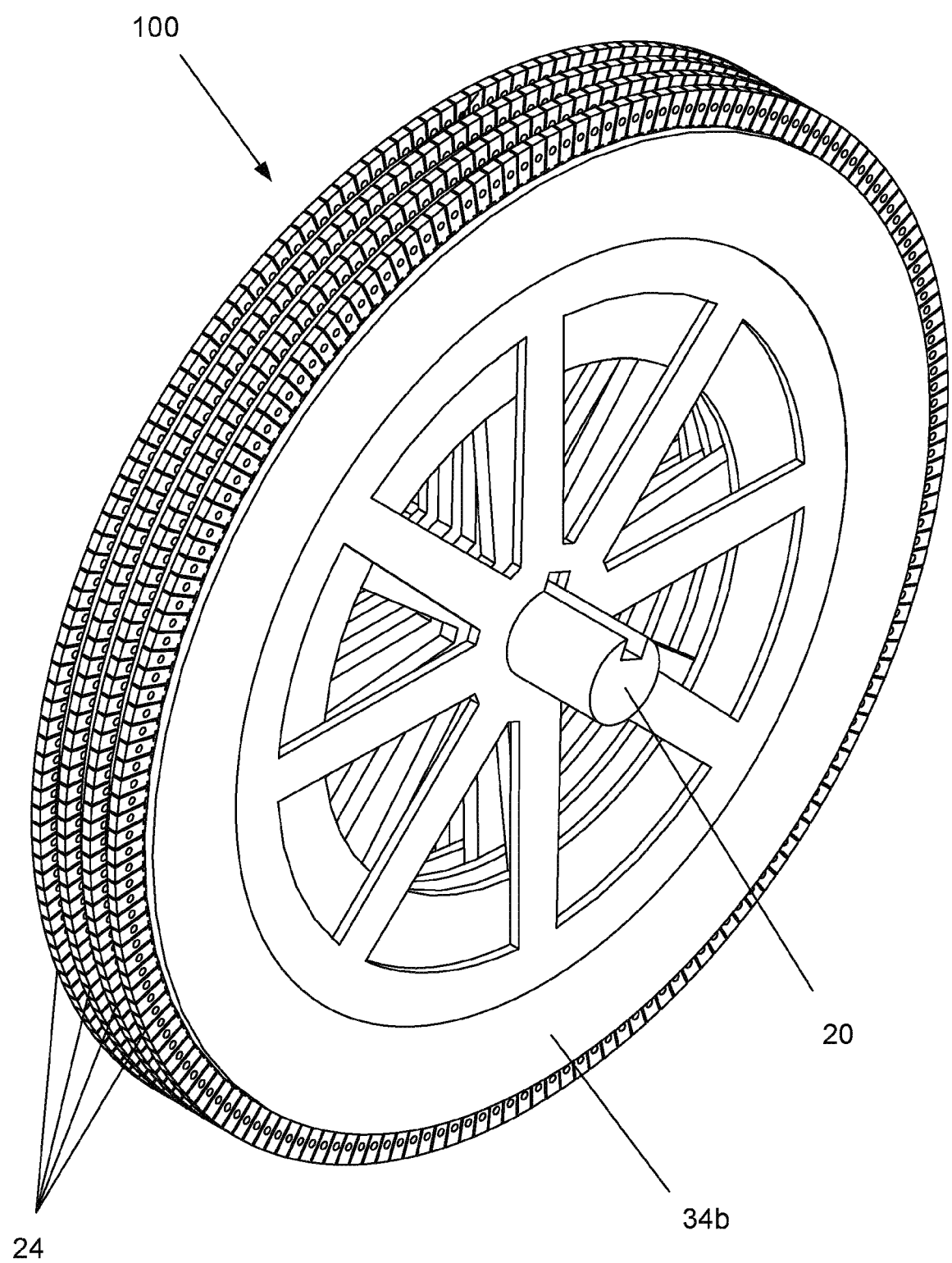
FIG. 8 is a side perspective view of another electric motor.

As shown, the motor 10 includes two stators 22 and one rotor 12. However, the motor 10 could alternatively include any suitable combination of stators 22 and rotors 12 to suit the needs of any particular application. For example, the motor 100 shown in FIG. 8 includes four stators 22 and three rotors 12. However, for ease of description, preferred embodiments of the invention are below described, by way of non-limiting example, with reference to the motor 10.

As particularly shown in FIG. 4, the motor 10 also includes a pair of rotor end discs 34a, 34b coupled to the shaft 20 bookending the rotor 12 and the stator 22 therebetween. The motor 10 further includes end plates 36a, 36b coupling the rotor 12 and the stator 22 therebetween. As shown, the end plates 36a, 36b are generally square planar members. However, plates 36a, 36b could alternatively take any suitable shape to suit the needs of the motor 10. The plates 36a, 36b include a fastener 37 for securing the component parts of the motor 10 therebetween. The fastener 37 includes, for example, bolts 37 extending through respective corners of the plates 36a, 36b. Alternatively, the fastener 37 includes any other suitable means for coupling the plates together.

As particularly shown in FIGS. 5a and 5b, the outer circumferential section 18 of the rotor disc 14 includes a plurality of slots 38 being shaped to receive and seat therein respective ones of the magnets 16. The rotor disc 14 includes a central hub 40 including an axially extending slot for receiving the shaft 20 therethrough. The rotor disc 14 also includes a plurality of support members 42 extending radially between the hub 40 the outer circumferential section 18. Slots 43 are formed between the support members 42 and the outer circumferential section 18. The slots 43 are shaped to assist with drawing in air axially through the motor 10 and expelling air radially from the motor 10. Airflow generated by slots 43 moving air through the motor in this manner help cool the motor 10. The slots also help to reduce the weight of the motor 10.

The hub 40 includes a fastener 44 for mating with the shaft 20. As shown, the fastener 44 is a female slot shaped to mate with a male protrusion (not shown) of the shaft 20. Alternatively, the fastener 44 is any other suitable means for mechanically coupling the rotor 12 to the shaft 20.

Figure 9:
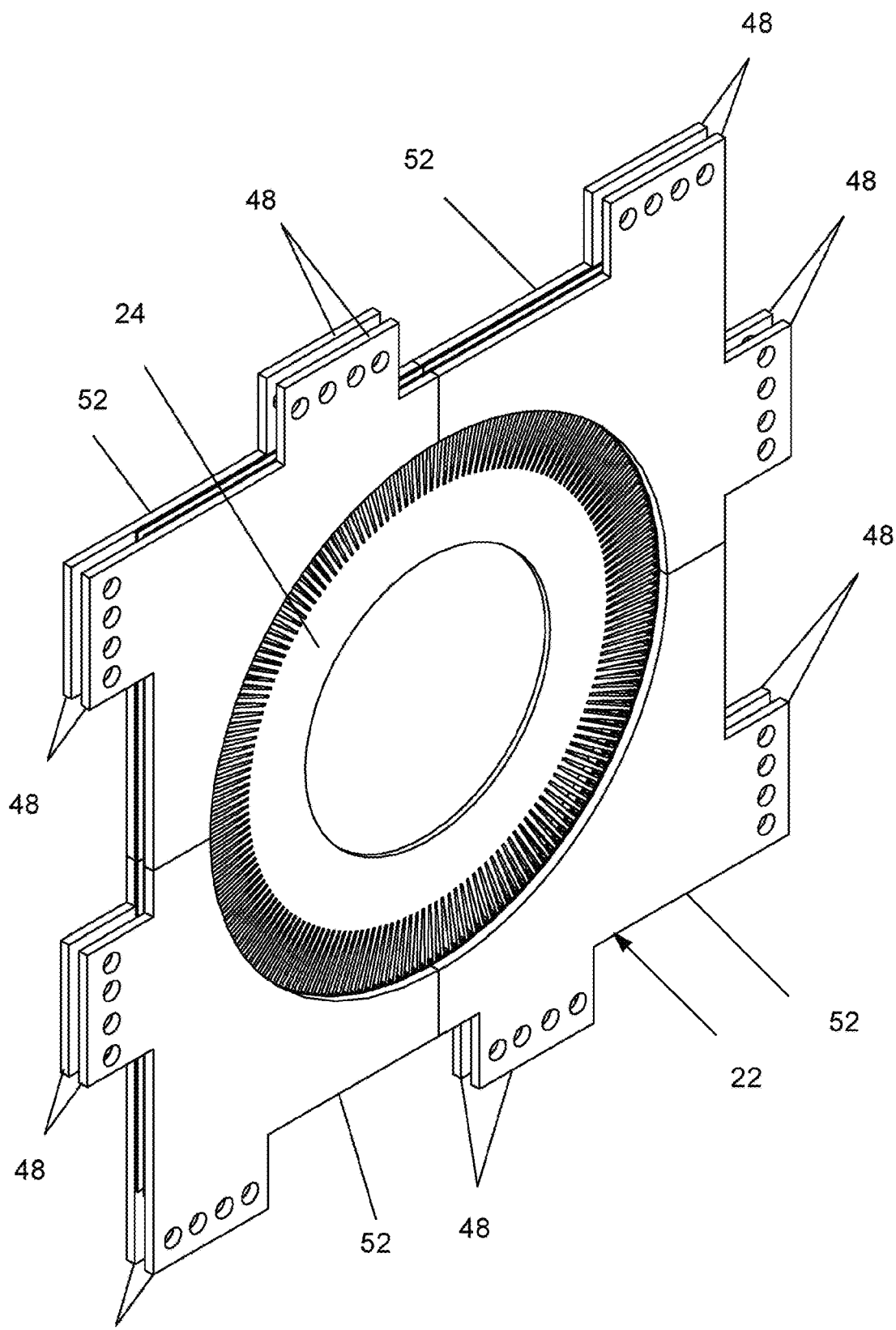
FIG. 9 is a side view of a stator of the motor shown in FIG. 1.
Figure 10:
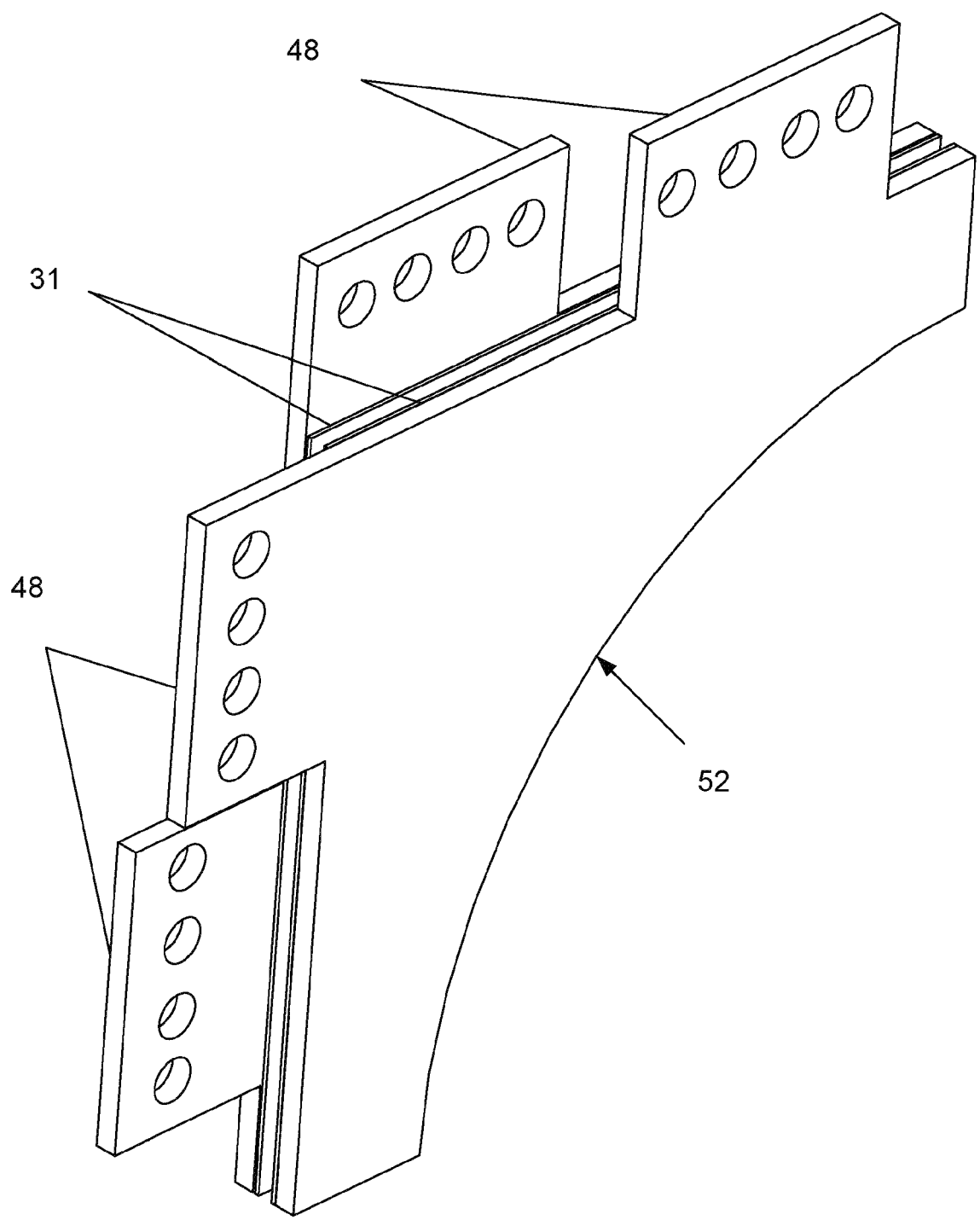
FIG. 10 is a side perspective view of a sector of the stator shown in FIG. 9.
Figure 11:
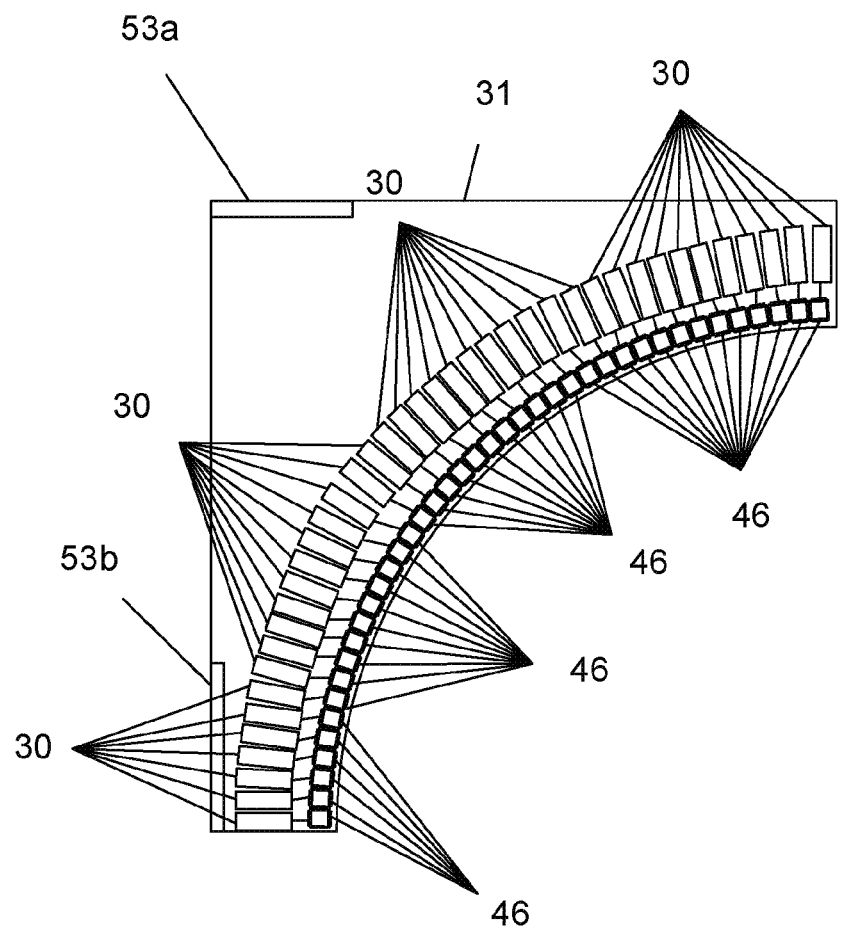
FIG. 11 is a side view of a printed circuit board of the stator shown in FIG. 9.

As particularly shown in FIGS. 9 to 11, the stator 22 includes the driver switches 30 mounted circumferentially around respective bars 28 of the stator disc 24. The stator 22 includes busbars 46 that electrically couple the driver switches 30 mounted on stator printed circuit board (PCB) 31 to the outer ends 32 of respective bars 38 of the stator disc 24.

Figure 12:
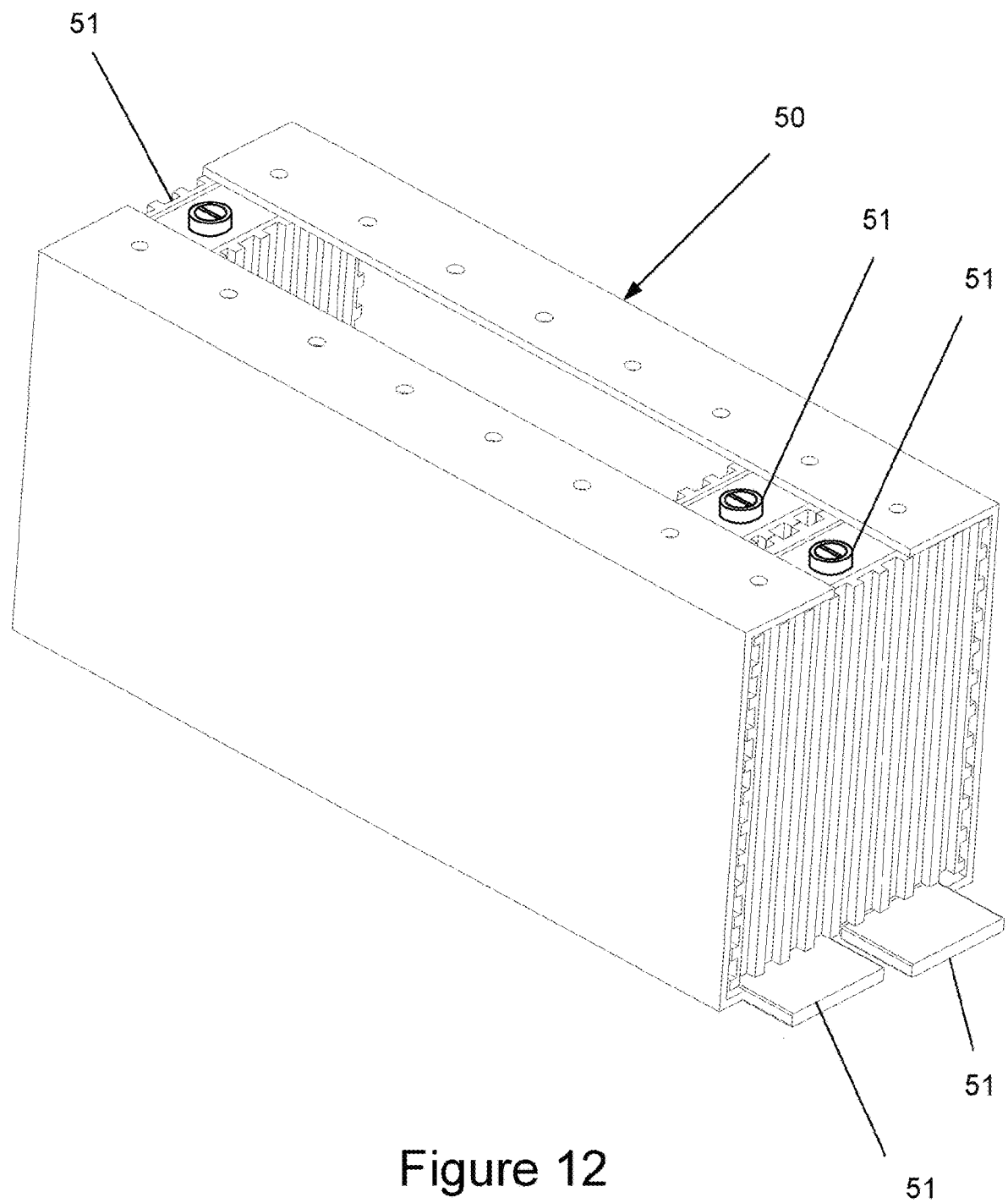
FIG. 12 is a side perspective view of a battery.
Figure 13:
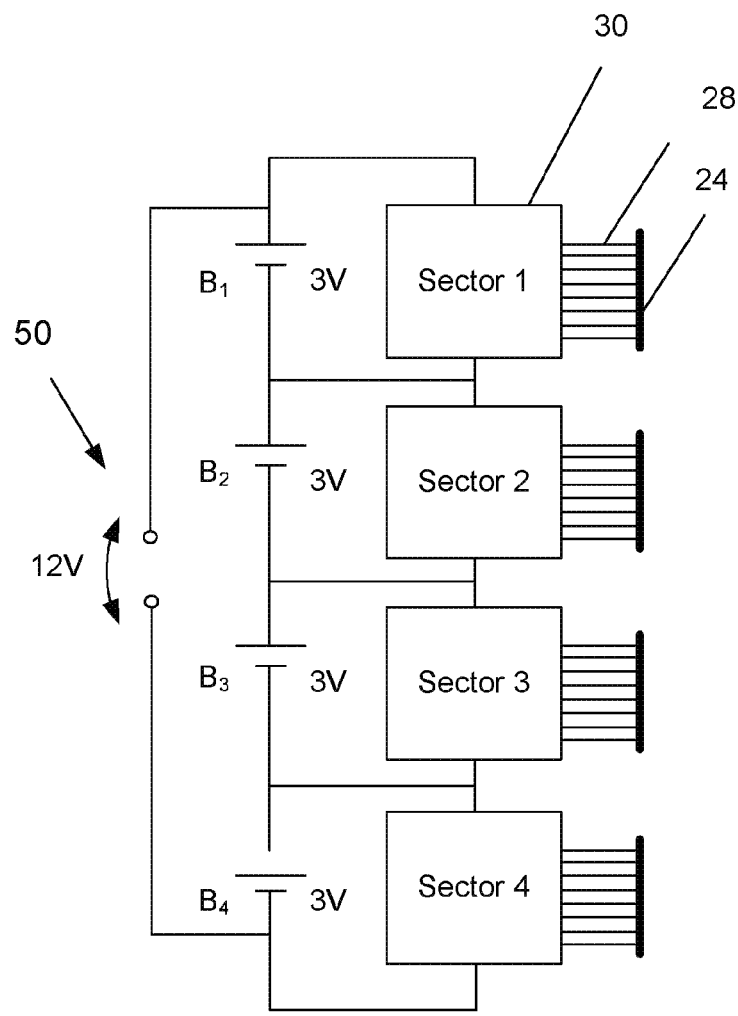
FIG. 13 is a schematic diagram of a power supply for the motor shown in FIG. 1.

As shown, the driver switches 30 are preferably arranged in sectors 52 around the stator disc 24. In this embodiment, the sectors 52 around the stator disc 24 are driven by a DC power source 50 that includes a plurality of batteries 51 ($B_1$, $B_2$, $B_3$, $B_4$), of the type shown in FIG. 12, arranged around the motor 10 in the manner shown in FIGS. 13 and 14. As shown, the batteries $B_1$, $B_2$, $B_3$, $B_4$ are connected in parallel to respective sectors 52 of the motor 10. As would be understood by those skilled in the relevant art, the motor 10 could use any number batteries 51 connected in parallel to service the sectors 52 of the motor 10 for a particular application.

As particularly shown in FIG. 11, the driver switches 30 of each sector 52 are mounted on printed circuit board. The PCB 31 of each sector 52 includes terminals 53a and 53b for electrically coupling to respective ones of the positive and negative busbars 48 which, in turn, couple the driver switches 30 to the DC power source 50 in the manner shown in FIG. 12.

The DC power source 50 is preferably a battery that includes a plurality of electrochemical cells connected in parallel. The motor 10 operates with ultra low voltage. In this specification the terms "ultra low voltage" (ULV) are taken to mean the voltage around that produced by a single electrochemical cell.

The parallel connected battery 50 provides many simplifications to existing electric vehicle systems. The motor 10 is a simple to construct and advantageously runs from around 3V, with the highest possible efficiency. For a 100 kW DC motor, this means a current of 33 kA.

The development of the motor 10 came from starting with the requirement to carry tens of thousands of amps at 3V. Historically, only homopolar motors are used in such applications. A slotted homopolar disc rotor was made and caused to run in a stationary magnetic field, using brushes to force a radial current through the disc. Since a brushless homopolar motor cannot be made, and brushes were deemed too inefficient and problematic to meet the project's requirements, the heteropolar motor 10 based on the same slotted disc was developed.

The heteropolar motor 10 is essentially a multiphase axial flux multi stator 22 machine with a conventional permanent magnet rotor 12. Each stator disc 22 may then be further segmented into sectors 52, driven by separate batteries 51, but otherwise a conventional brushless DC machine, albeit with attention given to current path lengths. To this end, the controller switches 30 are preferably, integrated with the motor 10 into the one assembly.

In terms of efficiency, the homopolar motors are surprisingly efficient, particularly if their brush losses can be ignored, so the concept of having radial currents in a flat conductor is not faulted from an electrical to mechanical power transfer perspective. Homopolar machines have the dual air gap, ironless rotor disc concept, without suffering a loss in efficiency due to flux linkages, even though solid disc machines tend to have curved and spread current paths between their peripheral brushes and central shaft. A solid disc rotor cannot however be used in a heteropolar machine due to eddy current losses in the disc 22 caused by the reversing field.

With a simple planar stator 22, the next design step was to divide the current and drive individual bars 28 with a half bridge 54 to make a multi-phase brushless DC machine 10.

The motor 10 includes control logic 30 to drive the half bridges 54. For example, the method for driving the bars 28 utilizes a small number of operational amplifiers (Opp Amps) and hall sensors.

FIG. 7a shows one possible embodiment of a simple analogue electronic controller 30 for the motor 10. Each stator bar 28 shown diagrammatically here as L1, L2, L3, and so on, is preferably provided with its own half bridge FET driver pair 54, particularly where the motor 10 is sized such that the maximum current in the bar 28 is about the same as the maximum current capacity of each FET 58. In this case, each bar 28 represents one phase of the motor 10. This minimizes the back emf per stator 'turn' and allows operation at the voltage of one electrochemical cell 51, even under heavy load with a lead acid cell, which can be around 1V.

The driver circuitry for the half bridges 54 can be any conventional 3 phase motor controller, if there are three bars 28 under each rotor pole. However, this motor 10 lends itself to having more than three phases, in which case conventional three phase motor controllers are not directly applicable.

The gate of each FET 58 may be driven via a 100Ω series resistor to limit the gate turn on current, and pulled down locally at the FET by a 1MΩ shunt resistor, which is useful for ensuring the FET cannot turn on in the event the connection between the gate and the control circuitry is lost. This is most useful if the control card is connected by a plug and socket to the FETs 58. In the embodiment shown, this is less necessary since the FETs 58 are mounted on the same PCB as the control logic, and connected by PCB traces.

The driver shown in this example embodiment is based on an IR2127 current sensing single channel driver. A further advantage of this low voltage motor 10 is that both the high and low side FETs 58 can be driven by the same gate source voltage rail, since the high side is only half of the supply rail above the low side.

This obviates the need for a boost driver for the high side, and hence we can use the same circuitry shown in FIG. 7a for both the low and high side FETs 58. The circuit for the high side FET in 58 is identical to that shown for the low side FET in diagram 30. The two circuits together form one half bridge driver.

One half bridge driver is needed for each phase. Where the motor 10 is a four phase motor, so it has eight IR2127 drivers, which driver phase A, B, C, D and their complements, A', B', C' and D'. To trigger the IR2127 driver, a simple connection to a hall switch would suffice. Rather than a switch, we show in this example an analogue hall sensor, fed to a simple op amp comparator, which allows adjustment of the trigger point relative to the position of the rotor magnet. This allows fine tuning of the timing of the motor.

The motor will work with a simple hall switch connected directly to the IR2127 drivers, but to allow for motor protection, an external stop button, throttle control, and reversing, more blocks are added in between the hall sensor and the gate driver. Since we have already used an LM339 comparator, it is expedient to use the same chip to provide these functions. The reverse/forward selection can be done by wiring the LM339 as an AND gate, shown in FIG. 5a as IC3A and IC4A. These gate either the north or the south pulse trains through, thus sending the driver a forward pulse train or reverse train, depending on the setting of the forward/reverse selector switch, which could be a gear lever in an electric vehicle application. IC2A is wired as an OR gate to allow either of these trains through to the driver.

Before the train can be sent to the driver, there is one final AND gate, which is used for protection. This again uses a comparator. The protection in this example includes over temperature, emergency stop, a cross interlock between high and low side drivers for any given bar, and a throttle pulse train. An advantage of the LM339 as an AND gate is that any number of conditions can be added by using additional diodes, three spare diodes have been shown.

The LM339 is an open collector op amp, hence we need pull up resistors on the output, shown as R3, R4, R12 and R16. The IR2127 is a current sensing driver, which lowers its FLT pin to ground when it senses overcurrent. Internally, it has an op amp comparator that measures the volt drop across the FET when it is conducting. Since the source/drain resistance is fairly constant, the volt drop is proportional to the current. As an added bonus, this voltage increases with increased FET temperature, providing over temperature protection, so that the FET will begin to not fire if it becomes hot under currents near its overcurrent trip limit.

To provide safe isolation of the motor, we can open isolator 62 to cut the gate supply rail from the driver.

Without gate voltage, the FETs form an effective isolation of the voltage from the motor, without the need for a high current electrical switch.

Of course, any other control logic platform, conventionally microcontroller based, or Field Programmable Gate Arrays, or any combination thereof, could be equally well used. The analogue control however is simple, robust, cheap and requires no firmware or software.

To eliminate hysteresis losses, the stator 22 magnetic circuit preferably does not include iron. The stator discs 24 are preferably made from a single sheet of conductive material, for example, a copper sheet, and without any iron, the stator 22 incurs no iron loss. With the twin stator 22 single permanent magnet rotor arrangement shown in FIGS. 1 to 4, using steel rotor end plates 34a, 34b to form the return path for the flux insures an effective magnetic field shape does not incur hysteresis or eddy current losses, since the steel rotates with the rotor, and does not see any change in flux. The at least one stator winding is formed by planar bars 28 extending radially from a common inner conducting ring 64.

The effective air gap is the conductor width, which is the thickness, of the stator disc 24 plus the thickness of the two mechanical clearance air gaps. In an axial flux embodiment, these gaps can be made quite small, typically 0.3 mm. With a stator disc 24 thickness of 1.5 mm, the effective air gap is just over 2 mm. Using N52 magnets in the rotor, a flux density in the gap of 1.0 T can be achieved.

Previously, the highest efficiency machine design has been the Lynch motor, which typically uses ferrite in epoxy on the stator. The motor 10 avoids this by having the stator windings self supporting. The Lynch motor loses some efficiency in stator hysteresis and end turn resistive losses, both of which are eliminated in the motor 10. Windage losses in higher speed machines can be minimized by making the rotor magnets 16 flush with the rotor yoke, rather than proud, and by using a thin solid rotor yoke instead of a spider; or, for a slower speed machine, the magnets 16 can be made deliberately proud to form and function as a straight blade cooling fan, to cool the stator bars 28.

The rotor magnets 16 and rotor yokes are conventional technology, made simply from aluminum sheet cut by subtractive milling, either with mechanical milling or water jet cutting.

The exhaust air from the air gap, caused by the rotor 12, cools the circuit boards and busbars 46, 48. Air is drawn in through the centre of the spider (that is, the radially aligned members 42) through slots 56 in the end plates 36a, 36b.

The busbars 48 form heat sinks for the power transistors, which can be cooled on both sides. An IRL6283 is one currently available package which allows cooling from both sides.

The driver transistors 58 for the half bridges 54 needed to be mounted physically close to the conductor bars 28, to eliminate the power loss from volt drop on any connecting leads, so the concept for mounting the control logic boards 30 right on the stator bar ends 32 was developed. As shown in FIG. 10, the bar ends 32 have a hole 60 to receive a rivet, bolt or via, to ensure they are clamped to the circuit boards 30.

The busbars 48 to connect the battery 50 to the circuit boards 30 are as large as possible to conduct the current, and they are as short as possible. As such, the busbars 48 are preferably integrated with the circuit board 30, in the sandwich configuration shown in FIG. 10, with positive on one side 48a, 48b and negative on the other. The busbars 48 extend out through the motor casing to allow direct connection of the battery 50.

No battery isolators are used. The FETs perform adequate isolation to prevent mechanical rotation by means of isolation of their gate supply, and there is no requirement in a ULV machine to provide full current isolation for any increased electrical safety.

To safely perform any work on the motor 10, the person simply may padlock the gate drive supply isolator 62 open.

Finally, to add modularity, the circuit boards 30 can be divided into any number of sectors 52 per stator, typically two or four.

To provide a light weight machine, the casing 36a, 36b may be aluminum, fiberboard or plastic. Since the stators 22 are so light, the casing has only to support the stator PCBs, and provide the torque reaction.

Advantageous Features of the Motor 10

1. A heteropolar machine, with high pole count, typically more than 24.

Lower pole counts are good for high speed motors, but require a large flux path traversing half way around both the rotor 12 and stator 22; this means the iron has to be large. A high pole count minimizes the flux path and hence the iron or neodymium weight, since the flux path in air needs to be minimized for maximum flux density.

2. A brushless DC motor 10 for high efficiency and reliability.

All high power high efficiency EVs use brushless motors, which are synchronous PM motors fed by a DC to AC variable frequency converter.

3. Utilizes an ironless stator, for high efficiency and power to weight ratio.

Printed circuit board (PCB) rotor motors have ironless rotors and zero rotor iron losses and a low cost armature. They need brushes when the PCB is the rotor. However, the motor 10 achieves the same zero iron losses by making the slotted disc the stator 14, and electronically commutating the bars 28 of the disc 24, causing the magnets 16 to be rotated, as for example is done in conventional 'outrunner' brushless model aircraft motors.

4. Provides optional modularity, as stator bars 28 may be connected in sector groups 52.

The number of sector groups 52 would be a factor of the number of pole pairs, except 1. Constructing the motor 10 in sectors 52 allows redundancy, since each sector would have its own PCBs 31 and busbars 48, 46. Each sector 52 may be connected in series or series/parallel connected, with some able to be bypassed, paralleled or series connected for higher machine efficiency at less than rated output power, thus running the remaining stators at higher efficiency.

Using two or more sectors 52 allows the stator 22 to be mechanically split, for easy assembly and disassembly, without having to pull the rotor 12 magnet 16 assemblies apart. For example, a 12 magnet 16 rotor 12, which has 6 pole pairs, could have 2, 3 or 6 sector groups 52.

Optionally, sector groups 52 may be connected in series to achieve a higher voltage than a single bar pair would achieve alone. This allows flexibility in machine design to suit a given system voltage.

5. An axial flux machine, for accuracy of air gaps and high efficiency.

A typical embodiment of the motor 10 would be configured as an axial flux machine. It can be also built as a cylindrical radial flux machine, although accessing both sides of a radial flux (cylindrical) machine is more difficult.

6. An axial flux machine, permitting different configurations using common modules.

Fitting a plurality of rotor 12/stator 22 assemblies along a common shaft 20 can also be utilized to achieve the required output power and to match the required terminal voltage. Stacking axial flux machines is easier than extending the rotor length of a cylindrical machine, since a cylindrical machine has to be made heavier to ensure it is stiff enough to hold the air gap tolerance.

7. Utilizes planar stator discs to minimize magnetic losses.

A key feature of the motor 10 is the planar stator discs 24 with single turn bars 28 electrically communicated. PCB rotors have previously been fabricated from double sided or multi layer boards, using vias or end connections to make loops. Making a single plane armature means there is no wasted air gap of fiberglass or other non-magnetic, non-conductive material. The design of the planar stator disc 24 of motor 10 gives the highest power to weight and smallest air gap for the size machine.

10. Has very low winding impedance.

As a consequence, the motor 10 has ultralow inductance and winding resistance, similar to a homopolar machine, which permits operation at ultra low voltages and very high currents.

11. Has very low leakage inductance.

A further benefit of low winding inductance means that there is very low leakage inductance, that is, less flux lines fail to couple the stator and rotor. This gives higher efficiency and power.

10. Has low switching losses.

Low inductance stator permits higher switching frequencies with lower switching losses, further improving efficiency.

11. Can tolerate high starting currents.

The un-insulated planar stator 24 of motor 10 permits very high starting currents and hence high starting torque, since the windings can be overloaded as their cooling is improved over conventional brushless motors, which required winding insulation.

12. Utilizes simple conventional electronics.

One embodiment of the motor control is to have each bar 28 individually controlled by one half bridge 54.

13. Minimizes conductor losses.

Each half bridge 54 is preferably radially disposed at the end of each bar 28, minimizing controller to motor cable length to zero.

14. Is inherently redundant.

The motor 10 as designed exhibits redundancy down to individual stator bars 28.

15. Can utilize mixed power sources, batteries and chemistries.

The configuration of the motor 10 allows it to be fed simultaneously from different voltage sources 50, including those using different battery chemistries. The voltage sources 50 could include ultracapacitor banks, or photovoltaic arrays, fuel cells and other low voltage supplies.

16. Can both motor and generate simultaneously.

DC motor 10 is capable of recharging some battery banks while motoring from others.

17. Can both motor and generate simultaneously in smallest configuration.

DC motor 10 is capable of motoring and generating simultaneously, even with a single rotor.

18. Design permits monitoring while running

The configuration motor 10 configuration also allows monitoring of stator bar temperature and open circuit voltage while the machine is running, by measuring the resistance of a bar 28 while it is open circuited.

19. Uses low-resistance busbars and conductors.

The motor's power supply bus bars 48 and the stator's inner circle busbar 46 can be very large, eliminating the wasted power losses and associated weight which conventional end turns incur, and which would otherwise make a ULV 20 kA machine highly inefficient.

20. No laminations, efficient flux paths.

Unlike conventional brushless motors, armature reaction does not demagnetize the laminated silicon steel pole shoes, as there are no pole shoes. The armature currents can only attempt to demagnetize the neodymium magnets; any saturation of the steel return flux path has little effect on the motor's torque. Thus very high currents can be used.

21. Very high efficiency and power to weight ratio

The motor 10 may be built light in weight, since there is no iron in the stator 22, and because the current density used in the copper is over five times higher than conventional machines, due to the lack of insulation on the winding, and the improved cooling of the winding bars. The motor 10 advantageously gives the highest power to weight possible, which has applications in many areas such as spacecraft, aircraft and lightweight electric vehicles.

22. Modularity and Operating Voltage

The modularity of the motor 10 also means that stator sector busbars 48 can optionally be connected in series allowing the use of a higher voltage power supply.

This configuration would obviate the many advantages of a parallel battery system, but would nonetheless embody a lightweight high efficiency motor for LV applications.

The Battery Powered Electric Vehicle

Figure 15:
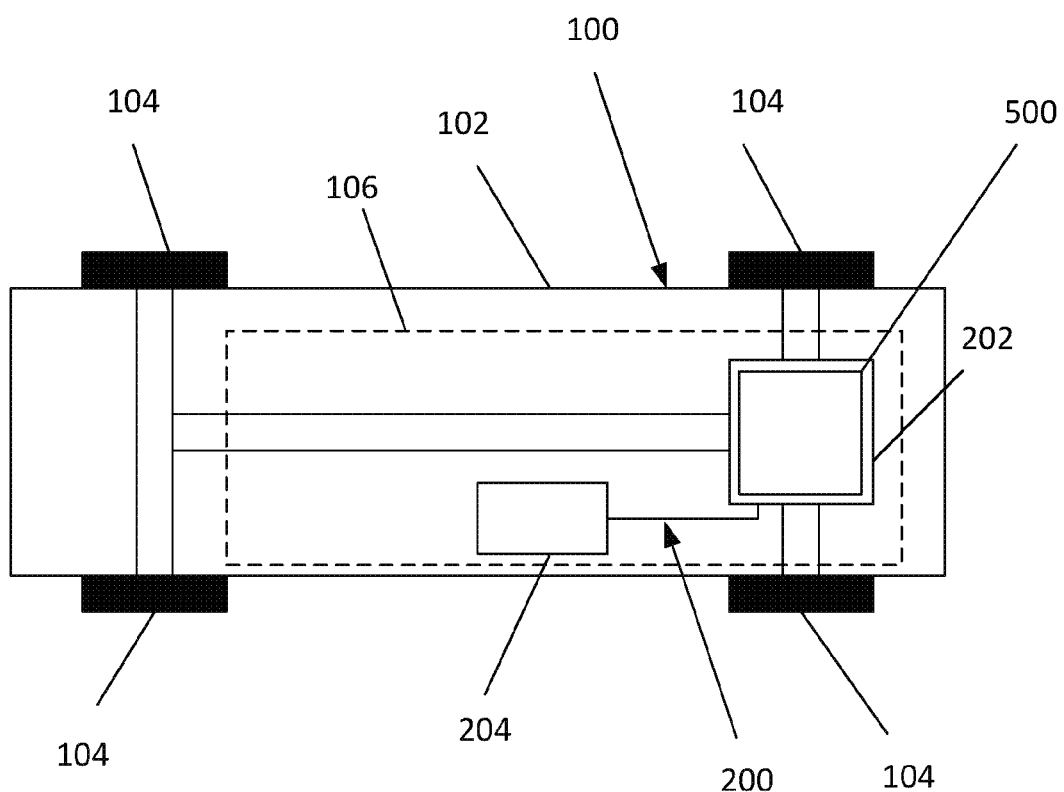
FIG. 15 is a schematic diagram of a battery powered electric vehicle.

The BEV 100 shown in FIG. 15 at least includes:
1. a chassis 102;
2. surface engaging means 104 (such as wheels, tracks, a propeller, etc);
3. a steering system (not shown);
4. a braking system (not shown); and
5. a drive system 106.

The chassis 102, surface engaging means 104, the steering system and the braking system all operate in accordance with known principles. Any suitable combination of known features from the prior art can be used with the BEV 100 and, as such, are not described here in further detail.

The drive system 106 includes:
a. Battery system 200;
b. Battery Busbars 300;
c. Isolators 400;
d. Motor 500; and
e. Switching 600.

The operation of these component parts of the BEV 100 is set out below in further detail.

a. Battery System 200

The battery system 200 is divided into two groups:
i. main battery 202; and
ii. auxiliary batteries 204.

Figure 14:
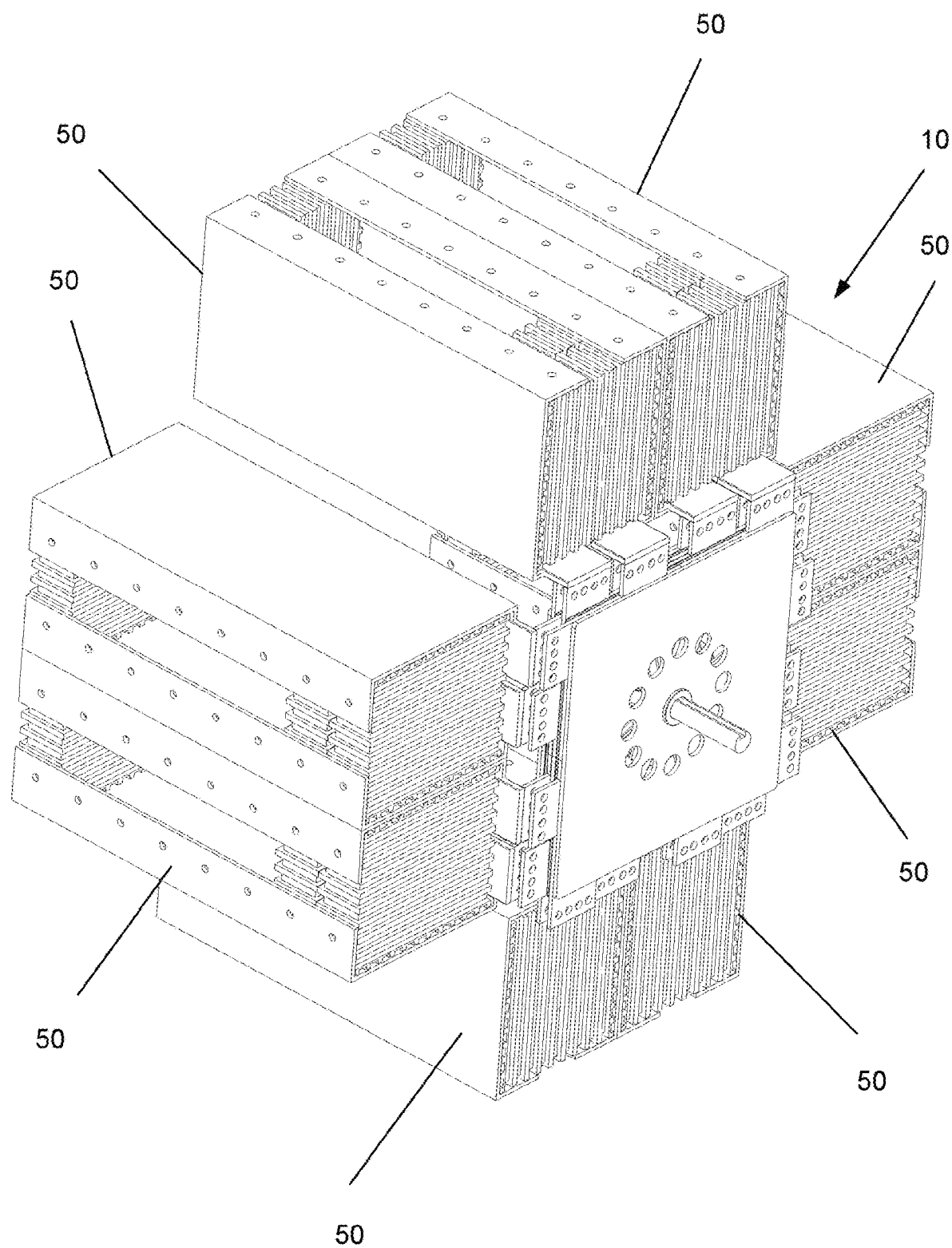
FIG. 14 is a side perspective view of the motor shown in FIG. 1 electrically connected to a power supply system.

The main battery 202 is made up of a plurality of batteries 51 located around the circumference of the motor 500, in the manner shown in FIG. 14, in order to minimize busbar resistive losses. The main battery 202 operates in an analogous manner to that of the DC power source 50 shown in FIG. 13 and includes a plurality of single cell batteries $B_1$ to $B_4$ Each battery 51 powers a sector 52 of the motor 500, rather than being connected to a common bus. This minimizes the fault level, and increases the fault tolerance and redundancy.

The main battery 202, power electronics, control system and motor 500 are preferably fitted to the vehicle 100 in the engine bay, as a complete assembly, factory assembled and tested. This ensures the integrity of the high current joints. Fitting such a complete motor assembly into a vehicle minimizes the adaptation of conventional assembly plants to the production of BEVs.

The arrangement of the batteries 51 of the main battery 202 around the motor 500 in a star configuration ensures the system losses are minimized. It also ensures the highest reliability, since the long conductors to the auxiliary batteries 204 in the rear of the vehicle are not critical for the vehicle's operation, only to a small percentage of its range.

It is then possible to replace the entire 'engine' of a convention vehicle with the motor 500 in a similar manner. The engine 500 can be shipped on pallets, lifted with an engine crane, for replacement by conventional garage mechanics. The 'engine' 500 advantageously weighs a similar amount to the ICE it replaces, ensuring the vehicle's 100 handling and chassis need not be modified, and the crash testing not need to be repeated. The engineer's certificate would be easier to obtain.

The auxiliary batteries 204 are preferably located at a plurality of convenient locations around the vehicle 100 such as:
i. under the tray for a ute;
ii. under the back seat;
iii. in place of the fuel tank;
iv. in the boot, and
v. even in a trailer.

The auxiliary batteries 204 may be different chemistries and voltage to the main battery 202. Their function is to transfer charge across to the main battery 202, as needed or required. The charge transfer may be regulated by DC to DC converter, in order to limit the losses in the cables. The auxiliary batteries 204 may be user replaceable, or swappable.

Eight to twelve batteries preferably make up the main battery 202. These are preferably selected for large number of cycles, and higher power, being too heavy for user swapping. The whole 'engine' assembly would then weigh about 380 kg, comparable to a conventional long engine, which is the ICE/transmission/starter battery/alternator/water pump. As with all BEVs, an electric vacuum pump for the brake booster, electric motor driven air conditioner, and electric heater would be required.

By wiring all cells in parallel, weaker cells are not forced into reverse polarity, and the need for cell monitoring is obviated.

With all cells in parallel, all cell voltages must be the same, so even if the cells have different temperatures and age, they cannot be forced into reverse polarity by the other cells.

b. Battery Busbars 300

An array of eight main batteries 202 will be used, for example. That is, 8×1000 Ah. Since the main cells are not interconnected, they do not need to be at the same voltage, state of charge, or cycle life. The battery busbars 300 will be as short as possible (typically only 100 mm long, and preferably made of copper or aluminum). the busbars 300 operate in an analogous manner to that of the busbars 48.

c. Isolators 400

As the maximum system voltage is the voltage of one cell, which is around 3.4V for LiFePO4, isolation to prevent electric shock is not required. Isolation between the battery 202 and the motor 500 is preferably performed by the same FET power transistors that are used to control the current flowing in to the windings. No separate full current battery isolator is needed. Isolation is preferably by electronic means, cutting gate power to the transistors. This ensures there is no means for generating torque which could cause the motor to rotate, and allows mechanical locking of the rotor if needed for isolation.

A ULV BEV 100 requires no high voltage safety systems to detect chassis faults, or to automatically isolate the battery in the event of this or other kinds of faults, or vehicle accident. This reduces the cost of the system, and eliminates the need for any compliance testing. In future, it is expected the regulations will increase the amount of safety systems needed in BEVs. Where such safety systems relate to HV batteries, these can be eliminated in a ULV system.

A ULV system requires no HV contactor and no HV isolator. Instead, the FET transistors can be turned off to provide isolation.

d. Motor 500

The motor 500 preferably includes all of the features of the motor 10 and like part are referenced with like numbers. Alternatively, the motor 500 is any other electric motor configured to be driven by the main battery 202 having a plurality of cells connected in parallel.

The motor 500 is preferably fitted with separate terminal connections for the busbars 48, say eight, spaced around its body. Each of the terminals would provide power to separate bar sectors 52, thus providing redundancy. It would be possible to run with less than all the bars and sectors energized; any combination is possible.

In an alternative embodiment, the motor 500 is:
(i) a multiple LV motor mechanically coupled on same or coupled shafts by gears or similar means;
(ii) a motor similar to the motor 10 where the stator was made from a PCB or a low-inductance winding rather than a single slotted sheet;
(iii) a motor similar to the motor 10 where the stator was made in a single segment;
(iv) a motor similar to the motor 10 where it was water cooled or the whole motor ran in a contained fluid rather than air;
(v) a homopolar motor with liquid metal or brushes; or
(vi) a heteropolar with copper windings, with or without iron laminations or iron powder.

Improved Range Estimation

Running one battery 202 flat, then the next, and so on, would allow measurement of the amount of charge and run time available, therefore allowing an improved range estimation or 'fuel gauge' for the vehicle 100. Improved range estimation relieves range anxiety, providing a marketable benefit of the BEV 100. The improved range calculation allows an accurate fuel gauge, so the user would not need to keep some 20 or 30% of the range in reserve, effectively wasting all the resources needed to provide that range: capital cost, vehicle weight, battery replacement costs and so on. Simply by providing an improved fuel gauge, and km remaining estimate, the vehicle's actual usable range can be increased by this 'range anxiety factor'.

Very Low Freewheeling Power Loss

Since there is no ferromagnetic stator, there is no cogging, so freewheeling down hill would incur no hysteresis motor losses, reduced drag. There is no need for a clutch between the wheels and the motor.

A further advantage is that each individual copper bar can be tested to determine its health. With a conventional three phase stator, the testing is limited to short, open and ground fault per winding. Inter-turn shorts cannot be located.

In a conventional motor, a single break in the copper of any one winding renders that winding inoperative, and usually results in machine failure due to the significant reduction in available torque. With this motor, any failure of a single bar has a negligible effect on the motor's performance.

This motor 500 facilitates automatic diagnostic tests (which can be run while the motor is running) on individual bars and their half bridges to check for all the typical failure modes of a motor. Tests can include open, short, ground fault, turn to turn shorts, open and shorted transistors. These tests are impossible on a conventional wound copper motor, since the winding turns are not individually accessible.

Bar temperature can be also monitored, since the bar is thermally coupled to the PCB, and temperature sensing may be provided on the board.

Bar torque contribution from individual bars similarly can be tested.

e. Switching 600

Commutation strategy and bar switching is controlled by the circuit 30 set out in FIGS. 7a to 7c. Control strategies for the switching of the bars 28, including the timing, phase angle and enabling of the bar 28, would be done to achieve either maximum torque for high acceleration, or maximum efficiency for longest range. Bars 28, sectors 52 and whole discs in multi disc stator motors 500 could be disabled to provide higher efficiency in the remaining bars 28.

The switching is preferably done by microcontrollers on circuit boards mounted around the periphery of the machine 500.

Improved Vehicle Range

The following factors are expected to improve the vehicle's range for a given weight of cells:
a. 30% improvement in the perceived usable range, due to the reduction in range uncertainty ("range anxiety"), permissible by staged cell discharge; and by eliminating any sensitivity to cell failures, unlike a series strung battery. Battery capacity can be estimated by simply measuring the discharge time for one battery, then multiplying the time for the number of remaining batteries. A complex and inaccurate model of the electrochemical cells is not required.
b. 20% improvement in actual physical range, by elimination of the BMS, so that each cell can be run over its full design capacity, from optimal charge voltage, to its desired DOD, rather than the overall capacity of the battery being determined by just the weakest cell's limits. Since each battery can be charged individually, by means of its own charger, and discharged individually, by means of its own winding cluster, its state of charge, age, temperature and other factors do not make any difference to the performance of the rest of the system; each battery can contribute all it can.
c. A further improvement is advantageously gained due to elimination of any voltage conversion: there are no inductors and no voltage conversion between the battery and the winding.
d. A further improvement due to the stator windings having no hysteresis or iron losses.
e. An efficiency improvement due to the use of ultra low on resistance FETs instead of conventional IGBTs.
f. An efficiency improvement due to shorter power busses between the battery and the motor.
g. An efficiency improvement due to elimination of isolator and contactor switch losses.

Integrated 12 V Supply

Since the sectors 52 are separate mechanically and electrically, with one cell per sector it is possible to charge cells individually, yet externally to the engine, use them as a series string. Therefore, a set of 3.4V LiFePO4 batteries could be externally used as a 12V battery, yet each cell being charged or discharged by the motors sector. This allows cell balancing and voltage conversion with no losses: there is no voltage step up. Conventional 12V vehicle systems could be used.

A 12V power supply integrated with the 'engine' batteries, ensures 12V is available without requiring any 600V to 12V buck converter, nor any dedicated 12V charger.

Eddy Current Braking

Another advantage of the motor 500 is that the uninsulated windings allow great extraction of heat, making eddy current braking practical. This can allow the motor to act as a true antilock brake.

In one embodiment, the bars 28 are curved. Curving the bars 28 allows for differential expansion between adjacent bars, due to differing temperatures, without mechanically stressing the joints or bars.

Battery Construction

Battery construction is simplified, particularly with cylindrical cells, since only two end plates are needed, and these can form the battery casing as well as function as the connecting busbars. Since the battery voltage is so low, very low cost and simple insulation is needed on the battery or conductors. Oxide layers, thin non-conducting films and paints can be sufficient as insulators.

The risk of fire caused by short circuit is greatly reduced, even in the presence of flammable fuels, since an ULV battery will not spark nor sustain an arc.

The cells may be divided up into smaller batteries, since here is no requirement for sectors to be any particular size to form a circuit, the minimum being two bars. Cells of different size may be connected in the one battery. This is not possible in any other battery.

Cells of differing age, temperature, type, casing and number of cycles can be used in the one battery, provided they are near enough to the battery terminal voltage so that the initial charge or discharge they receive or give to the pack is within their rating.

The use of this motor 500 practically allows the possibility of swapping only part of the application's battery. BEVs may be designed such that a discharged auxiliary battery pack may be replaced, by the user, for a charged one.

Partial battery replacement is not presently possible with any other battery powered motor.

No electronics per cell is required. Batteries of thousands of cells are then feasible.

For micro motors, the motor and entire circuitry can be constructed on the one silicon substrate, by conventional photolithographic means. Miniaturization of motors based on this design is easier since the stator is planar. This leads to application in consumer electronics, such as vibrator motors in phones, to camera focusing motors. Biomedical applications requiring a fault tolerant, miniature motor for heart replacement.

As with other axial flux machines, the architecture lends itself to expandability, by addition of stator modules. Since this motor has such thin stator, however, comparatively many more stators can be axially stacked before shaft flex becomes a design problem.

In a series connected battery, each cell contributes two conductor joints to the circuit. Each joint has resistive losses, which increase as the joint ages. In addition, the probability of joint failure also increases with age. In a conventional 600V battery of LiFePO4 cells, this means around 800 joints. Failure of any single one of these joints results in failure of the whole battery. Failure in one joint in a parallel connected battery leads to loss of only a single cell.

Power Generation

In one embodiment, the motor 10 is modified for power generation. Such a machine 10 could also be used for power generation, such as wind or hydro applications, where a parallel connected battery provides advantages of elimination of the need for any battery management system.

Many modifications will be apparent to those skilled in the art without departing from the scope of the present invention.

LIST OF PARTS

10 Motor
12 Rotor
14 Rotor disc
16 Magnet
18 Outer circumferential section of rotor disc
20 Shaft
22 Stator
24 Stator disc
26 Slot
28 Electrically conductive bar
30 Driver switch
31 Stator printed circuit board
32 End of bar
34a, 34b Rotor end disc
36a, 36b End plate
37 Fastener
38 Slot
40 Hub
42 Support member
43 Slot
44 Fastener
46 Busbars for electrically coupling the driver switches 30 to the outer ends 32 of respective bars 38 of the stator disc 24
48 Busbars 48 for coupling the driver switches 30 to a DC power source
48a Positive busbar
48b Negative busbar
50 DC power source
51 Battery
52 Sector
54 Half bridge
56 Slots
58 Driver transistor
60 Holes
62 Gate drive supply isolator
100 Battery powered electric vehicle
102 Chassis
104 Surface engaging means
106 Drive system
200 Battery system
202 Main battery
204 Auxiliary battery
300 Battery bus
400 Isolators
500 Motor
600 Switching
700 Battery monitoring system

The invention claimed is:

1. A permanent magnet DC electromagnetic heteropolar motor, including:
   (a) at least one permanent magnet rotor;
   (b) a shaft in mechanical communication with the rotor such that axial rotation of the rotor causes axial rotation of the shaft;
   (c) a stator including at least one stator winding; and
   (d) a plurality of switches, each functioning to provide commutation switching for the stator so as to generate a torque on the rotor and thereby cause said axial rotation of the shaft,
   wherein the stator includes a stator disc having circumferentially distributed and radially directed slots therein that define corresponding radially directed elongate electrically conductive bars, wherein said at least one stator winding is formed by the bars, the bars being planar and extending radially from a common inner electrically conducting ring that is continuous in a circumferential direction, wherein the common inner electrically conducting ring connects radially inner ends of at least three of the elongate bars to each other such that alternating current (AC) signals can flow along the elongate bars of the stator in alternating radial directions so as to generate a torque on the rotor and thereby cause the axial rotation of the shaft.

2. The motor claimed in claim 1, wherein said switches include multiple transistor half bridge switches, each one of said half bridge switches connecting to separate points of the stator winding, where said half bridge transistor switches function to provide commutation switching and to regulate current in said stator winding so as to generate a torque on the rotor and thereby cause said axial rotation of the shaft.

3. The motor claimed in claim 2, wherein, in use, two of said half bridges are activated, one high side transistor on in one half bridge and one low side transistor on in one other half bridge, in order to complete a circuit to form a one turn winding.

4. The motor claimed in claim 1, wherein said stator includes a planar stator disc, and said at least one stator winding is a single sheet of conductive material.

5. The motor claimed in claim 1, wherein said at least one stator winding includes a plurality of electrically independent sectors.

6. The motor claimed in claim 1, further comprising an electronic controller for each at least one stator winding, wherein said controller comprises one or more printed circuit boards (PCBs).

7. The motor claimed in claim 1, further comprising DC bus bars that electrically couple the switches to outer ends of respective ones of the bars, wherein said bus bars function as heat sinks for said stator windings, and/or wherein said bus bars are cooled by the flow of exhaust air ejected radially from an air gap between the stator and the rotor by the motion of said rotor.

8. The motor claimed in claim 1, wherein the stator is ironless.

9. The motor claimed in claim 1,
   wherein said driver switches are electrically coupled to radial outer ends of the elongate bars of the stator and configured to generate currents that flow along the elongate bars in alternating radial directions so as to generate a torque on the rotor and thereby cause axial rotation of the shaft.

10. The motor claimed in claim 1, including rotor end discs coupled to the shaft bookending the rotor and the stator therebetween.

11. The motor claimed in claim 10, wherein the rotor end discs form a return path for flux generated by the rotor.

12. The motor claimed in claim 1, wherein an outer circumferential section of a rotor disc of the rotor includes a plurality of slots shaped to receive and seat therein respective magnets.

13. The motor claimed in claim 12, wherein the rotor disc includes a central hub for receiving the shaft therethrough and a plurality of support members extending radially between the hub and the outer circumferential section to form slots for airflow.

14. The motor claimed in claim 1,
   wherein a terminal voltage of said motor is equal to a voltage of one electrochemical cell of a battery that includes a plurality of electrochemical cells connected in parallel, and
   wherein the power of said motor is at least 1 kW.

15. The motor claimed in claim 1, comprising a plurality of phases, each phase provided by at least one switch of said plurality of switches.

* * * * *